(12) United States Patent
Hirama et al.

(10) Patent No.: US 11,581,941 B2
(45) Date of Patent: Feb. 14, 2023

(54) COMMUNICATION DEVICE AND COMMUNICATION SYSTEM

(71) Applicant: Sony Semiconductor Solutions Corporation, Kanagawa (JP)

(72) Inventors: Takayuki Hirama, Tokyo (JP); Junya Yamada, Kanagawa (JP); Hiroo Takahashi, Kanagawa (JP); Toshihisa Hyakudai, San Diego, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/822,480

(22) Filed: Mar. 18, 2020

(65) Prior Publication Data
US 2021/0297385 A1 Sep. 23, 2021

(51) Int. Cl.
*H04B 7/155* (2006.01)
*H04W 8/26* (2009.01)
(Continued)

(52) U.S. Cl.
CPC ......... *H04B 7/15592* (2013.01); *G01D 4/004* (2013.01); *G06F 15/16* (2013.01);
(Continued)

(58) Field of Classification Search
CPC .. H04B 7/15592; H04W 40/10; H04W 40/22; H04W 36/0088; H04W 36/023;
(Continued)

(56) References Cited

U.S. PATENT DOCUMENTS

| 7,317,733 B1 | 1/2008 | Olsson et al. |
| 2010/0191911 A1* | 7/2010 | Heddes ............ G06F 15/16 |
| | | 711/E12.091 |

(Continued)

FOREIGN PATENT DOCUMENTS

| JP | 2011239011 A | 11/2011 |
| JP | 2016149609 A | 8/2016 |

OTHER PUBLICATIONS

International Search Report dated Jun. 8, 2021 of corresponding International Application No. PCT/JP2021/009858.

*Primary Examiner* — Kyung H Shin
(74) *Attorney, Agent, or Firm* — Michael Best & Friedrich LLP

(57) ABSTRACT

[Object] Effectively perform data communication
[Solving Means] A communication device includes: a LINK that generates a first output signal on a basis of a first external signal from a first external device, outputs the first output signal to a second external device, generates a second output signal on a basis of a second external signal from the second external device, and outputs the second output signal to the first external device, in which each of the first output signal and the second external signal includes command information indicating content of a command transmitted from the first external device, final-destination-device-identification-information for identifying a final destination device of data transmitted from the first external device, internal address information indicating an internal address of the final destination device, data length information indicating a length of the data transmitted from the first external device, and data-end-position-information indicating an end position of the data transmitted from the first external device.

19 Claims, 39 Drawing Sheets

(51) Int. Cl.
  *H04L 61/00* (2022.01)
  *H04L 69/08* (2022.01)
  *G01D 4/00* (2006.01)
  *H04W 40/22* (2009.01)
  *H04L 7/00* (2006.01)
  *H04W 40/10* (2009.01)
  *G06F 15/16* (2006.01)
  *H04J 11/00* (2006.01)
  *H04L 101/604* (2022.01)

(52) U.S. Cl.
  CPC ............ *H04J 11/00* (2013.01); *H04L 7/0016* (2013.01); *H04L 61/35* (2013.01); *H04L 69/08* (2013.01); *H04W 8/26* (2013.01); *H04W 40/10* (2013.01); *H04W 40/22* (2013.01); *H04L 2101/604* (2022.05)

(58) Field of Classification Search
  CPC .... H04W 36/0027; H04J 11/00; H04J 3/0667; H04L 41/082; H04L 41/12; H04L 45/02; H04L 7/0016; G06F 15/16; G06F 3/065; G06F 3/0613; G06F 3/0679; G06F 3/0659; G06F 12/0246; G06F 12/0215; G06F 12/0638; G06F 12/12; G06F 12/0866
  See application file for complete search history.

(56) References Cited

U.S. PATENT DOCUMENTS

| | | | |
|---|---|---|---|
| 2011/0124284 A1* | 5/2011 | Adam | H04B 7/15592 455/7 |
| 2013/0205022 A1* | 8/2013 | Kagan | G01D 4/004 709/224 |
| 2017/0099131 A1* | 4/2017 | Bosch | H04L 41/082 |
| 2017/0245184 A1* | 8/2017 | Nagesh Shetigar | H04J 11/00 |
| 2019/0205244 A1* | 7/2019 | Smith | G06F 3/065 |

* cited by examiner

Figure 5. Write Format To Remote I²C Slave

Table1:
Stored data in mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |

FIG.8

Table2: (I2C Cmd Table in I2C Cmd Unit)
I2C command packet value

| Function | bit | 7 | 6 | 5 | 4 | 3 | 2 | 1 | 0 |
|---|---|---|---|---|---|---|---|---|---|
| ACK | 81 | 1 | 0 | 0 | 0 | 0 | 0 | 0 | 1 |
| NACK | 7E | 0 | 1 | 1 | 1 | 1 | 1 | 1 | 0 |
| Repeated_start | 60 | 0 | 1 | 1 | 0 | 0 | 0 | 0 | 0 |
| End of data | 9F | 1 | 0 | 0 | 1 | 1 | 1 | 1 | 1 |
| cmd_done | FF | 1 | 1 | 1 | 1 | 1 | 1 | 1 | 1 |
| Rsv_command | XX | X | X | X | X | X | X | X | X |

FIG.10

Table3:
Stored data in mem2

| Sub Adr | Data[7:0]   |
|---------|-------------|
| 0       | CLK_value   |
| 1       | cmd_mode    |
| 2       | Slave Adr   |
| 3       | Sub_adrH    |
| 4       | Sub_adrL    |
| 5       | LengthH     |
| 6       | LengthL     |
| 7       | wdata       |
| ...     | ...         |
| N-2     | wdata       |
| N-1     | End of data |

FIG.12

Table3:
Stored data in mem2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |
| N | A or Nak |

FIG.15

Table1:
Stored data in mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |
| N | CLK_value |
| N+1 | Cmd_mode |
| N+2 | Master_Adr |
| N+3 | Sub_adrH |
| N+4 | Sub_adrL |
| N+5 | LengthH |
| N+6 | LengthL |
| N+7 | Slave_adr |
| N+8 | A or Nak |
| N+9 | End of data |

FIG.17

Table1:
Stored data in mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |
| N | CLK_value |
| N+1 | Cmd_mode |
| N+2 | Master_Adr |
| N+3 | Sub_adrH |
| N+4 | Sub_adrL |
| N+5 | LengthH |
| N+6 | LengthL |
| N+7 | Slave_adr |
| N+8 | A or Nak |
| N+9 | End of data |
| N+10 | Clear |

FIG.20

Table1:
Stored data in mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |

FIG.25

Table3:
Stored data in mem2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |

FIG.27

Table3:
Stored data in mem2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | rdata |
| ... | ... |
| N-2 | rdata |
| N-1 | A or Nak |
| N | End of data |

FIG.29

Table1:
Stored data in mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | CLK_value |
| 9 | cmd_mode |
| 10 | Master Adr |
| 11 | Sub_adrH |
| 12 | Sub_adrL |
| 13 | LengthH |
| 14 | LengthL |
| 15 | Slave Adr |
| 16 | A or Nak |
| ... | rdata0 |
| N-3 | ... |
| N-2 | Rdata M |
| N-1 | End of data |

FIG.32

Table 1:
Stored data in mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | CLK_value |
| 9 | cmd_mode |
| 10 | Master Adr |
| 11 | Sub_adrH |
| 12 | Sub_adrL |
| 13 | LengthH |
| 14 | LengthL |
| 15 | Slave Adr |
| 16 | A or Nak |
| ... | Rdata 0 |
| N-3 | ... |
| N-2 | Rdata M |
| N-1 | End of data |
| N | Clear |

FIG.34

Table3:
Stored data in mem2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | A or Nak |
| 9 | rdata 0 |
| ... | ... |
| N-2 | rdata M |
| N-1 | End of data |

FIG.36

COMMUNICATION DEVICE AND COMMUNICATION SYSTEM

TECHNICAL FIELD

The present disclosure relates to a communication device and a communication system.

BACKGROUND ART

A technology for performing, in the case where data communication is performed between a master device and a slave device, serial communication between a SerDes device for the master device and a SerDes device for the slave device has been proposed.

CITATION LIST

Patent Literature

Patent Literature 1: Japanese Patent Application Laid-open No. 2011-239011

DISCLOSURE OF INVENTION

Technical Problem

In the case where a slave device has received data transmitted from a master device, the slave device generally transmits an ACK signal indicating the reception to the master device. In the case where two SerDes devices are disposed between the master device and the slave device, the ACK signal passes through these SerDes devices, and thus, it takes a considerable time after the slave device transmits the ACK signal until the ACK signal is received by the master device.

If the master device has a specification that a new signal cannot be transmitted to the slave device until the ACK signal from the slave device arrives, there is a possibility that processing of the master device is delayed because it takes time to receive the ACK signal.

In this regard, the present disclosure provides a communication device and a communication system that are capable of effectively performing data communication.

Solution to Problem

In order to achieve the above-mentioned object, in accordance with the present disclosure, there is provided a communication device, including:

a LINK that generates a first output signal on a basis of a first external signal from a first external device, outputs the first output signal to a second external device, generates a second output signal on a basis of a second external signal from the second external device, and outputs the second output signal to the first external device, in which each of the first output signal and the second external signal includes command information indicating content of a command transmitted from the first external device, final-destination-device-identification-information for identifying a final destination device of data transmitted from the first external device, internal address information indicating an internal address of the final destination device, data length information indicating a length of the data transmitted from the first external device, and data-end-position-information indicating an end position of the data transmitted from the first external device.

The final-destination-device-identification-information may be located next to the command information, the internal address information is located next to the final-destination-device-identification-information, and the data length information may be located next to the internal address information.

The command information may include command format information for defining a command format according to a predetermined communication standard between the communication device and the second external device.

The command information may include data-end-determination-condition-information for specifying a condition for determining end of the data transmitted from the first external device.

Each of the first output signal and the second external signal may further include communication frequency information for specifying a communication frequency between the second external device and the final destination device.

Each of the first output signal and the second external signal may include a command obtained by protocol-converting a command of I2C (Inter-Integrated Circuit) communication into a command of a predetermined communication standard between the communication device and the second external device.

The LINK may transmit, to the first external device, an ACK signal indicating an acknowledge or a NACK signal indicating a negative acknowledge every time the LINK receives each information unit constituting the first external signal from the first external device.

The LINK may include a storage unit that stores a signal corresponding to the first external signal and a signal corresponding to the second external signal, and the LINK may collectively perform, where reception of the first external signal from the first external device is finished, protocol-conversion on the first external signals that have been received and stored in the storage unit and then generates the first output signal.

The protocol-conversion performed by the LINK may be protocol-conversion compatible with TDD (Time Division Duplex).

The LINK may transmit the first output signal to the second external device, and stores, upon receiving information indicating that processing on the first output signal has been completed from the second external device, a signal indicating completion of the processing in the storage unit.

The LINK may release a storage area of the storage unit on a basis of a command from the first external device.

The LINK may output, to the first external device, processing completion information for the second external signal transmitted from the second external device in response to a request signal from the first external device or output, to the first external device, an interrupt request flag for performing interrupting processing on the first external device.

The LINK may receive, from the first external device, the first external signal including output instruction information for instructing output of the first output signal and transmission finishing information indicating that transmission of the first external signal is finished.

The LINK may recognize, where a first value has been received as data-end-determination-condition-information for specifying a condition for determining end of the data transmitted from the first external device and then transmission finishing information indicating that transmission of the first external signal is finished has been received, that the first external signal to be transmitted from the first external device has ended.

The LINK may recognize, where a second value has been received as data-end-determination-condition-information for specifying a condition for determining end of the data transmitted from the first external device and then output instruction information for instructing output of the first output signal and transmission finishing information indicating that transmission of the first external signal is finished have been received, that the first external signal transmitted from the first external device has ended regardless of a value of the data-end-determination-condition-information received after the reception of the second value.

The LINK may transmit the first output signal to the second external device and then release a storage area of the storage unit.

The LINK may perform, a predetermined number of times or within a predetermined time, at least one of outputting of a signal obtained by performing protocol conversion on the second output signal in response to a signal based on the second external signal stored in the storage unit to the first external device for each information unit and receiving of each information unit constituting the first external signal output from the first external device.

In accordance with the present disclosure, there is provided a communication system, including:

a Master SerDes including a first LINK; and a Slave SerDes including a second LINK, in which the first LINK generates a first output signal on a basis of a first external signal from a Master, outputs the first output signal to the Slave SerDes, generates a third output signal on a basis of a second output signal from the Slave SerDes, and outputs the third output signal to the Master, the second LINK generates the second output signal on a basis of a second external signal from a Slave, outputs the second output signal to the Master SerDes, generates a fourth output signal on a basis of the first output signal from the Master SerDes, and outputs the fourth output signal to the Slave, and each of the first output signal, the second output signal, the first external signal, and the second external signal includes command information indicating content of a command transmitted from the Master, final-destination-device-identification-information for identifying the Slave, internal address information indicating an internal address of the Slave, data length information indicating a length of data transmitted from the Master, and data-end-position-information indicating an end position of the data transmitted from the Master.

BRIEF DESCRIPTION OF DRAWINGS

FIG. 8 is a diagram showing an example of data stored in a table 1 in a mem1.

FIG. 10 is a diagram showing types and bit strings of commands transmitted on a communication standard X protocol.

FIG. 12 is a diagram showing an example of table 3 in a mem2 during a Random Write operation.

FIG. 15 is a diagram showing a state of a storage area of the mem2 before the storage area is released in response to the Random Write Command.

FIG. 17 is a diagram showing the state table1 in the mem1 after receiving response data from the Slave SerDes for the Random Write Command.

FIG. 20 is a diagram showing stored data in the mem1 before the storage area is released in response to the Random Write Command.

FIG. 25 is a diagram showing stored data in the table1 in the mem1 during the Random Read operation.

FIG. 27 is a diagram showing stored data in a table3 in the mem2 during the Random Read operation.

FIG. 29 is a diagram showing the stored data in the table3 in the mem2 after the Random Read operation.

FIG. 32 is a diagram showing an example of data in the mem1 after receiving response data to the Random Read Command from the Slave SerDes.

FIG. 34 is a diagram showing an example of the stored data in the table1 in the mem1 before the storage area is released in response to the Random Read Command.

FIG. 36 is a diagram showing an example of the stored data in the table3 in the mem2 in the case where Current read is performed.

MODE(S) FOR CARRYING OUT THE INVENTION

Hereinafter, an embodiment of a communication device and a communication system 3 will be described with reference to the drawings. Although the main components of the communication device and the communication system 3 will be mainly describe below, the communication device and the communication system 3 can have components or functions that are not illustrated or described. The following description does not exclude components or functions that are not illustrated or described.

Figure 1:
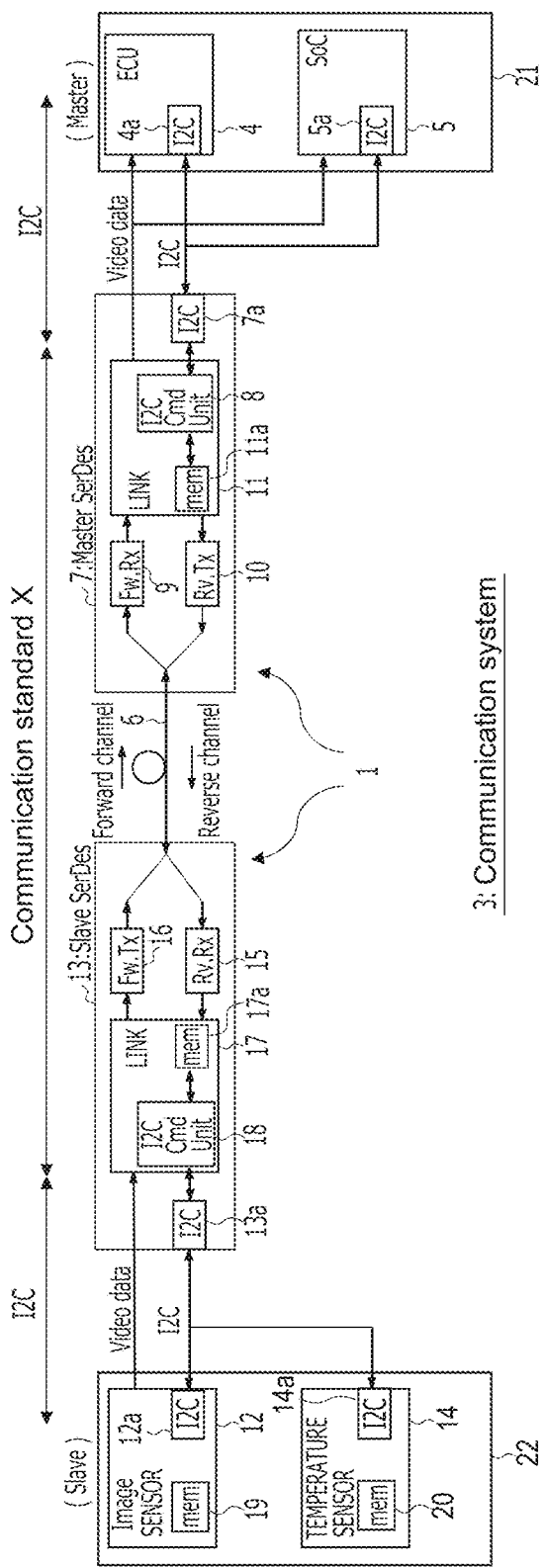
FIG. 1 is a block diagram showing a schematic configuration of a communication system including a communication device according to an embodiment.

FIG. 1 is a block diagram showing a schematic configuration of the communication system 3 including a communication device 1 according to an embodiment. The communication system 3 in FIG. 1 is, for example, a camera video recognition system that is a part of an ADAS (Advanced Driver Assistance System). The communication system 3 in FIG. 1 includes an ECU 4 and an SoC 5 that can operate as a Master 21, an image sensor 12 and a temperature sensor 14 that can operate as a Slave 22, a Master SerDes 7, and a Slave SerDes 13. The Master SerDes 7 and the Slave SerDes 13 are connected to each other so as to be capable of performing communication in accordance with a predetermined communication standard (hereinafter, referred to as the "communication standard X"). Examples of the predetermined communication standard X include, but not limited to, FPD-Link III and A-phy, ASA. Each of the Master SerDes 7 and the Slave SerDes 13 corresponds to the communication device 1 according to this embodiment. In the present specification, the Master SerDes 7 will be described as the SerDes1 and the Slave SerDes 13 will be referred to as the SerDes2 in some cases.

The Master 21 and the Master SerDes 7 are connected to each other so as to be capable of performing communication through, for example, I2C (Inter-Integrated Circuit) communication. Note that the communication between the Master 21 and the Master SerDes 7 is not limited to the I2C communication, and may be, for example, communication using GPIO (General Purpose Input/Output).

Similarly, the Slave 22 and the Slave SerDes 13 are connected to each other so as to be capable of performing communication through, for example, I2C communication. Note that the communication between the Slave 22 and the Slave SerDes 13 is not limited to the I2C communication, and may be, for example, communication using GPIO.

The ECU 4 is for controlling the entire communication system 3 and includes an I2C 4a. The ECU 4 receives an image signal from the Master SerDes 7 and performs I2C communication with the Master SerDes 7 via the I2C 4a.

The SoC 5 is for performing, for example, image recognition or video processing and includes an I2C 5a. The SoC 5 receives an image signal from the Master SerDes 7 and performs I2C communication with the ECU 4 and the Master SerDes 7 via the I2C 5a.

The image sensor 12 is for capturing an image and includes an I2C 12a and a mem 19. The image sensor 12 outputs image data of the captured image to the Slave SerDes 13 and performs I2C communication with the Slave SerDes 13 via the I2C 12a. In the present specification, the image sensor 12 will be referred to as the CIS (CMOS image sensor) in some cases. The mem 19 is capable of storing pixel data obtained by capturing by the image sensor 12 and storing data transmitted from the Master 21. In the present specification, the mem 19 will be referred to as the mem3.

The temperature sensor 14 is for measuring the temperature of an arbitrary target (e.g., the image sensor 12) and includes an I2C 14a. The temperature sensor 14 performs I2C communication with the Slave SerDes 13 via the I2C 14a and transmits temperature data regarding the measured temperature or the like to the Slave SerDes 13.

The Master SerDes 7 format-converts a signal of an I2C protocol, which is received from the Master 21, into a signal of a communication standard X protocol, transmits the converted signal to the Slave SerDes 13, appropriately format-converts a signal of the communication standard X protocol, which is received from the Slave SerDes 13, to generate image data or a signal of an I2C protocol, and outputs the generated image data or signal to the Master 21. This Master SerDes 7 includes a LINK 11, a forward receiver (Fw.Rx) 9, a reverse transmitter (Rv.Tx) 10, and an I2C 7a.

The LINK 11 format-converts the signal of an I2C protocol, which is received from the Master 21 via the I2C 7a, into a signal of the communication standard X protocol, and transmits the converted signal to the Slave SerDes 13 via the Rv.Tx 10. Further, the LINK 11 generates image data from the signal of the communication standard X protocol, which is received from the Slave SerDes 13 via the Fw.Rx 9 and transmits the image data to the Master 21, or generates a signal of the I2C protocol, which includes information other than image data, and outputs the signal to the Master 21 via the I2C 7a.

The Slave SerDes 13 format-converts the signal of the I2C protocol or the image signal, which is received from the Slave 22, into a signal of the communication standard X protocol, transmits the converted signal to the Master SerDes 7, appropriately format-converts the signal of the communication standard X protocol, which is received from the Master SerDes 7, into a signal of the I2C protocol, and outputs the converted signal to the Slave 22. This Slave SerDes 13 includes an I2C 13a, a LINK 17, a forward transmitter (Fw.Tx) 16, a reverse receiver (Rv.Rx) 15, and the I2C 13a.

The LINK 17 format-converts the signal of the I2C protocol or the image data, which is received from the Slave 22 via the I2C 13a, into a signal of the communication standard X protocol, and transmits the converted signal to the Master SerDes 7 via the Fw.Tx 16. Further, the LINK 17 converts the signal of the communication standard X protocol, which is received from the Master SerDes 7 via the Rv.Rx 15, into a signal of the I2C standard, and transmits the converted signal to the Slave 22 via the I2C 13a. At this time, there is a possibility that the following 1) and 2) problems occur.

1) In the case where the ECU 4 or the SoC 5 constituting the Master 21 controls the image sensor 12 or the temperature sensor 14 constituting the Slave 22 through I2C communication, the Master 21 needs to receive an ACK signal or a NACK signal from the Slave 22 every time an information unit such as one byte is transmitted. At this time, the propagation delay of I2C communication via the Master SerDes 7 and the Slave SerDes 13 is generally larger than a period of one clock of I2C communication (frequency of one clock is 400 kHz, 1 MHz, or the like) in some cases. In this case, the Master SerDes 7 holds the clock (SCL) of the I2C protocol signal at a Low level until the Master SerDes 7 receives, from the Slave SerDes 13, an ACK signal or a NACK signal from the Slave 22, the I2C protocol-conversion is finished, and the Master SerDes 7 is ready to output an ACK signal or a NACK signal to the Master 21 via the I2C 7a. The Master SerDes 7 releases the held Low level of the clock (SCL) of the I2C protocol signal after the Master SerDes 7 is ready to output the ACK signal or the NACK signal transmitted to the Master 21 by the Slave 22. As a result, the Master 21 is capable of resuming I2C communication and receiving an ACK signal or a NACK signal. While the Master SerDes 7 holds the SCL at the Low level, the Master 21 cannot perform I2C communication. For this reason, such a problem that it takes time to transfer a command or communication with another Slave 22 (e.g., the temperature sensor 14 in the case of standing by for an ACK signal or a NACK signal from the image sensor 12) connected to the I2C bus cannot be performed occurs.

Figure 2:
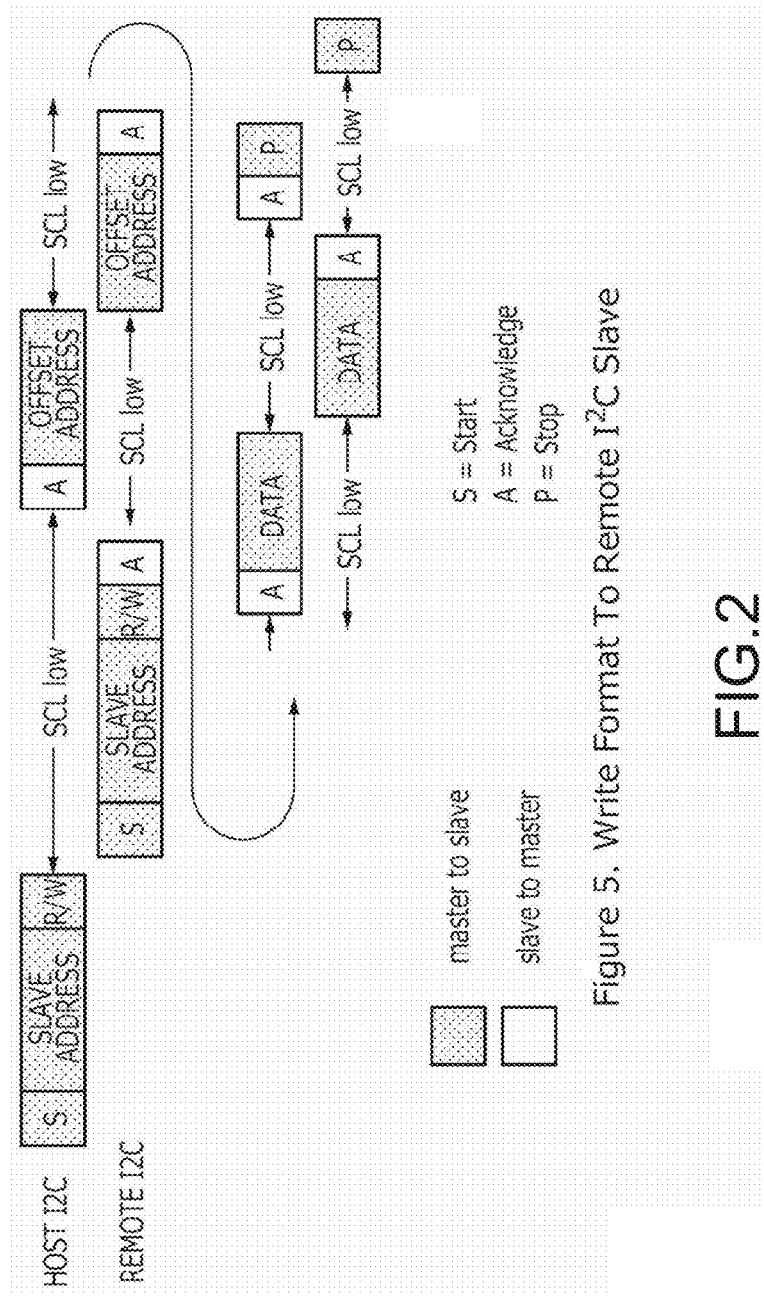
FIG. 2 is a diagram showing the write format of a packet in the case where writing is performed by I2C communication between Master-Slaves via a general SerDes device.

FIG. 2 shows I2C communication in the case where writing to a REMOTE I2C (e.g., the Slave 22) is performed from a HOST I2C (e.g., the Master 21) via the Master SerDes 7 and the Slave SerDes 13 through I2C communication. Here, the SCL low section of the HOST I2C indicates that the SCL is held at the low level until the Master SerDes 7 is ready to output the ACK signal or the NACK signal from the Slave 22 and the HOST I2C cannot perform I2C communication during this time.

2) Further, it is favorable that not only the image sensor 12 and the temperature sensor 14 but also various devices can be connected as the Slave 22 to the Slave SerDes 13. There is a possibility that the various Slaves 22 have different I2C operation clocks. For this reason, assumption is made that the Slave SerDes 13 performs I2C communication with the various Slaves 22, and the I2C operation clock (operation clock of I2C communication between the Slave 22 and the Slave SerDes 13) of the Slave 22 is set lower than necessary in some cases.

In FIG. 2, in the case where the I2C operation clock frequency of the Slave 22 is set lower than necessary as described above, it means that the I2C operation section (section other than the SCL low on the REMOTE I2C side in FIG. 2) of the REMOTE I2C becomes longer, which further increases the time necessary for completing the I2C communication along with the problem that the SCL Low section on the HOST I2C side becomes longer.

In order to solve the above-mentioned 1), in the communication system 3 in FIG. 1, the Master SerDes 7 is provided with a storage device (mem 11a in FIG. 1), stores, in the case where the Master SerDes 7 receives one byte from the Master 21, the one byte in the storage device, and returns, instead of the Slave 22, an ACK signal or a NACK signal to the Master 21. Therefore, it is possible to shorten the period of the SCL low extended by the Master 21.

Further, in order to solve the above-mentioned 2), in the communication system 3 in FIG. 1, the Master 21 sets CLK_value (Data[0]) described below and the Slave SerDes 13 performs I2C communication with the Slave 22 with the frequency specified by the CLK_value (Data[0]). Therefore, the Slave 22 and the Slave SerDes 13 are capable of realizing I2C communication with the specified frequency.

The LINK 11 in FIG. 1 includes an I2C Cmd Unit 8 and a mem 11a. The I2C Cmd Unit 8 stores a table2 in a ROM (illustration omitted) and the mem 11a stores a table1. The mem 11a is a volatile memory. In the present specification, the mem 11a is referred to as the mem1 in some cases. This LINK 11 writes, every time the LINK 11 receives one byte from the Master 21 via the I2C 7a, the one byte to the table1 of the mem 11a, returns, instead of the Slave 22, an ACK signal or a NACK signal to the Master 21, reads, in the case where a predetermined condition is satisfied (e.g., data is written up to End of data), the table1, and transmits the read data to the Slave SerDes 13 via the Rv.Tx 10. Further, the LINK 11 writes, to the table1 of the mem 11a, the signal received from the Slave SerDes 13 via the Fw.Rx, reads, in the case where a predetermined condition is satisfied (e.g., data is written up to End of data), the table1, and performs I2C communication with the Master 21 via the I2C 7a, or transmits, to the Master 21, the image data obtained by imaging by the image sensor 12, which is simultaneously received from the Slave SerDes 13 via the Fw.Rx 9.

The LINK 17 in FIG. 1 includes an I2C Cmd Unit 18 and a mem 17a. The I2C Cmd Unit 18 stores the table2 in a ROM (illustration omitted), and the mem 17a stores a table3. In the present specification, the mem 17a is referred to as the mem2 in some cases. This LINK 17 writes the signal received from the Master SerDes 7 via the Rv.Rx 15 to the table3 of the mem 17a, reads, in the case where a predetermined condition is satisfied (e.g., data is written up to End of data), the table3, and transmits the read signal to the Slave 22 via the I2C 13a. Further, the LINK 17 writes, in the case where the LINK 17 performs I2C communication with the Slave 22 via the I2C 13a to receive a signal or receives temperature data converted into the I2C protocol from the temperature sensor 14 via the I2C 13a, the received signal or temperature data to the table3 of the mem 17a, reads, in the case where a predetermined condition is satisfied (e.g., data is written up to End of data), the table3, and transmits the read signal or temperature data to the Master SerDes 7 via the Fw.Tx 16.

Figure 3:
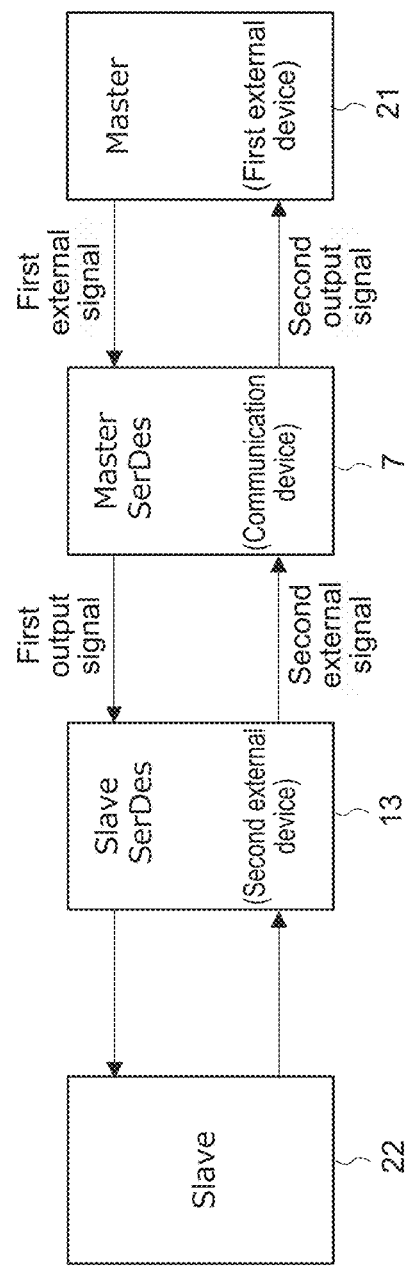
FIG. 3 is an equivalent block diagram when a Master SerDes performs I2C communication between a Master and a Slave SerDes.

FIG. 3 is an equivalent block diagram when the Master SerDes 7, of the communication system 3 in FIG. 1, performs I2C communication between the Master 21 and the Slave SerDes 13. In FIG. 3, the Master SerDes 7 is used as the communication device 1, the Master 21 is used as a first external device, and the Slave SerDes 13 is used as a second external device.

The communication device 1 (Master SerDes 7) in FIG. 3 generates a first output signal on the basis of a first external signal from the first external device (Master 21), and outputs the generated first output signal to the second external device (Slave SerDes 13). Further, the communication device 1 (Master SerDes 7) generates a second output signal on the basis of a second external signal from the second external device (Slave SerDes 13), and outputs the generated second output signal to the first external device (Master 21).

Figure 4:
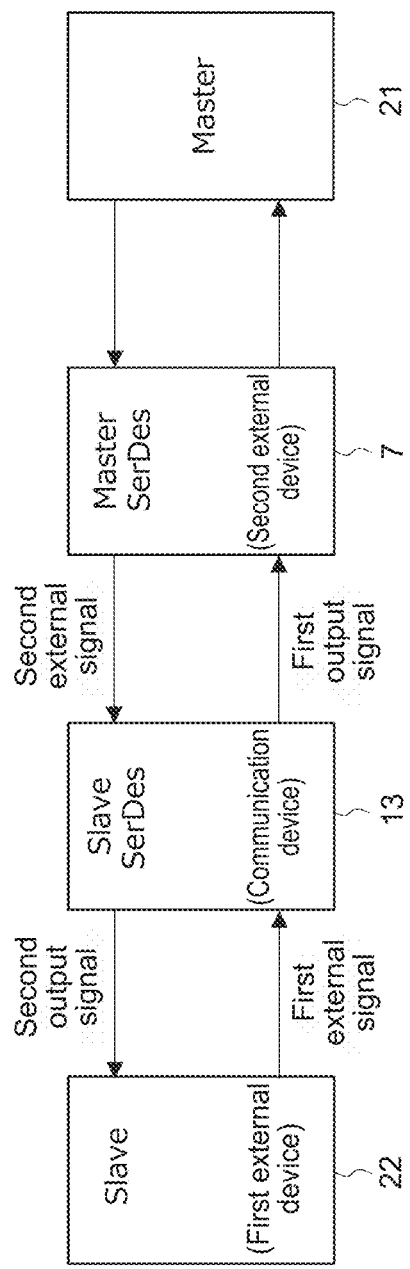
FIG. 4 is an equivalent block diagram when the Slave SerDes performs I2C communication between a Slave and the Master SerDes.

FIG. 4 is an equivalent block diagram when the Slave SerDes 13, of the communication system 3 in FIG. 1, performs I2C communication between the Slave 22 and the Master SerDes 7. In FIG. 4, the Slave SerDes 13 is used as the communication device 1, the Slave 22 is used as the first external device, and the Master SerDes 7 is used as the second external device.

The communication device 1 (Slave SerDes 13) in FIG. 4 generates a first output signal on the basis of a first external signal from the first external device (Slave 22), and outputs the generated first output signal to the second external device (Master SerDes 7). Further, the communication device 1 (Slave SerDes 13) generates a second output signal on the basis of a second external signal from the second external device (the Master SerDes 7), and outputs the generated second output signal to the first external device (the Slave 22).

Each of the first output signal and the second external signal in FIG. 3 and FIG. 4 includes command information Cmd_mode indicating the content of a command transmitted from the first external device, final-destination-device-identification-information Slave_Adr for identifying the final destination device of data transmitted from the first external device, internal address information Sub_Adr of the final destination device, data length information Length of the data transmitted from the first external device, and data-end-position-information End of Data transmitted from the first external device.

The Slave_Adr may be located next to the Cmd_mode, the Sub_Adr may be located next to the Slave_Adr, and the Length may be located next to the Sub_Adr.

The Cmd_mode may include command format information Cmd_mode[2:0] for defining a command format according to the communication standard X, which includes a function of identifying a Write command and a Read command. That is, the Cmd_mode may include Cmd_mode [2:0] for defining a command format according to a predetermined communication standard between the communication device 1 and the second external device.

The Cmd_mode may include at least Cmd_mode[0] to Cmd_mode[7], and data-end-determination-condition-information Cmd_mode[7] may specify a condition for determining end of the data transmitted from the first external device.

Each of the first output signal and the second external signal may further include communication frequency information CLK_value for specifying a communication frequency between the second external device and the final destination device.

Each of the first output signal and the second external signal may include a command obtained by protocol-converting a command of I2C (Inter-Integrated Circuit) communication into a command of a predetermined communication standard between the communication device and the second external device.

The LINKs 11 and 17 may each transmit, to the first external device, an ACK signal indicating an acknowledge or a NACK signal indicating a negative acknowledge every time the corresponding LINK receives each information unit constituting the first external signal from the first external device.

The LINKs 11 and 17 may each include a storage unit that stores a signal corresponding to the first external signal and a signal corresponding to the second external signal.

The LINKs 11 and 17 may each collectively perform, where reception of the first external signal from the first external device is finished, protocol-conversion on the first external signals that have been received and stored in the storage unit and then generate the first output signal.

The protocol-conversion performed by the LINKs 11 and 17 may be protocol-conversion compatible with TDD (Time Division Duplex).

The LINKs 11 and 17 may each transmit the first output signal to the second external device, and store, upon receiving information indicating that processing on the first output signal has been completed from the second external device, a signal indicating completion of the processing in the storage unit.

The LINKs 11 and 17 may each release a storage area of the storage unit on the basis of a command from the first external device.

The LINKs 11 and 17 may each output, to the first external device, processing completion information for the second external signal transmitted from the second external device in response to a request signal from the first external device or output, to the first external device, an interrupt request flag for performing interrupting processing on the first external device.

The LINKs 11 and 17 may each receive, from the first external device, the first external signal including output instruction information cmd_done for instructing output of the first output signal and transmission finishing information P (STOP condition) indicating that transmission of the first external signal is finished.

The LINKs 11 and 17 may each recognize, where a first value has been received as data-end-determination-condition-information for specifying a condition for determining end of the data transmitted from the first external device and then transmission finishing information P (STOP condition) indicating that transmission of the first external signal is finished has been received, that the first external signal to be transmitted from the first external device has ended.

The LINKs 11 and 17 may each recognize, where a second value has been received as data-end-determination-condition-information for specifying a condition for determining end of the data transmitted from the first external device and then output instruction information for instructing output of the first output signal and transmission finishing information indicating that transmission of the first external signal is finished have been received, that the first external signal transmitted from the first external device has ended regardless of a value of the data-end-determination-condition-information received after the reception of the second value.

The LINKs 11 and 17 may each transmit the first output signal to the second external device and then release a storage area of the storage unit.

The LINKs 11 and 17 may each perform, a predetermined number of times or within a predetermined time, at least one of outputting of a signal obtained by performing protocol conversion on the second output signal in response to a signal based on the second external signal stored in the storage unit to the first external device for each information unit and receiving of each information unit constituting the first external signal output from the first external device.

Figure 5:
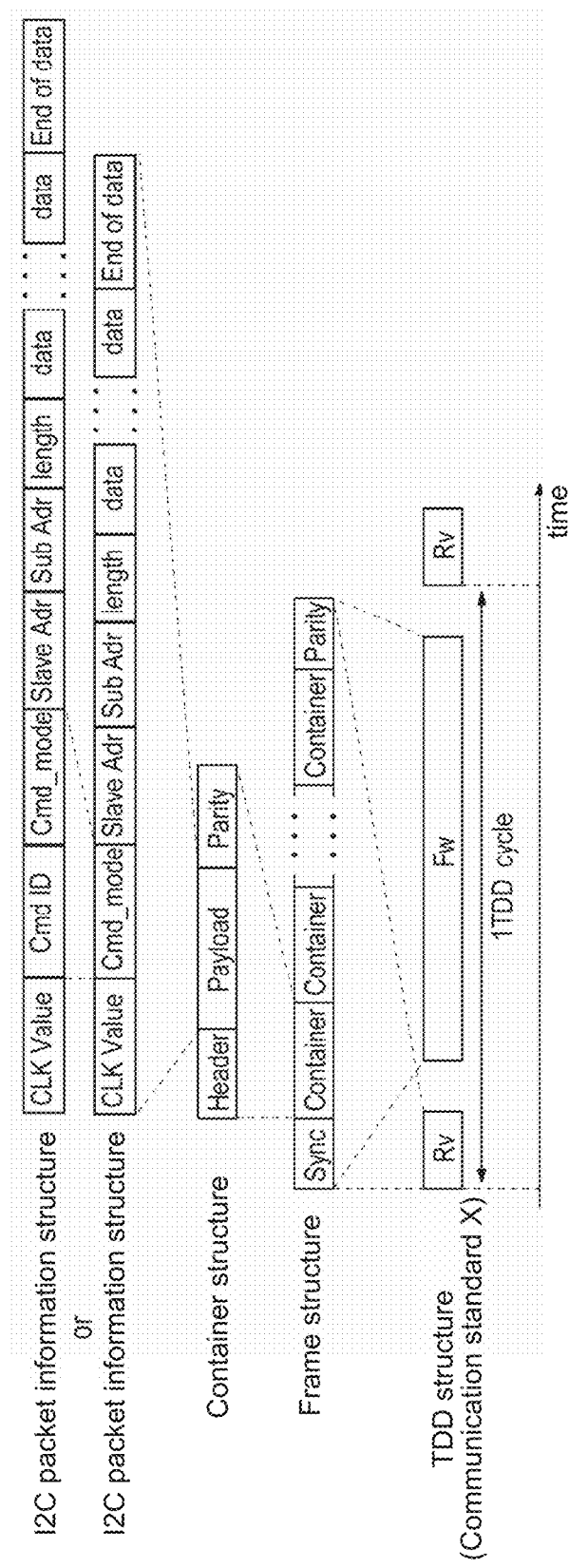
FIG. 5 is a diagram showing an example of the frame structure of a signal of a communication standard X protocol.

FIG. 5 is a diagram showing an example of a frame structure of a signal of a communication standard X protocol transmitted/received between the Master SerDes 7 and the Slave SerDes 13.

The frame structure in FIG. 5 includes a plurality of containers between a Sync pattern and Parity. The Sync pattern is a signal pattern for synchronizing the physical layers of the Master SerDes 7 and the Slave SerDes 13 with each other. The plurality of containers include, for example, approximately 2 to 100 containers. Depending on the signal transmission state, the number of containers included in the frame structure changes. The Parity is a bit or bit strings for error detection or error correction processing.

The structure of the container includes Header, Payload, and Parity. The Header includes address information indicating the transmission destination of Payload, or the like. The Payload is the body of the signal to be transmitted/received. The Payload includes OAM (Operations, Administration, Maintenance) for SerDes control, in addition to a video signal. The Parity is a bit or bit strings for error detection or error correction processing of Payload.

The Payload includes pieces of information CLK value, Cmd_mode, Slave Adr, length, data, and End of data. The CLK value indicates the operation clock of the Slave 22, i.e., the SCL frequency that the Slave SerDes 13 uses for I2C communication with the Slave 22. The Cmd_mode indicates the content of a command transmitted from the Master 21. The Slave Adr is address information for identifying the Slave 22. The length indicates the length of data transmitted from the Master 21. The End of data is an end position of the data transmitted from the Master 21.

Note that in the case where the Cmd_mode is extended to two bytes, the upper one byte of the Cmd_mode may be assigned to the Cmd_ID. The Cmd_ID is identification information for distinguishing and identifying the command transmitted from the Master 21.

In the case where data communication is performed between the Master 21 and the Slave 22 by a TDD method, the signal ratio of a signal Rv from the Master 21 to the Slave 22 and the signal ratio of a signal Fw from the Slave 22 to the Master 21 in one TDD cycle can be changed by changing the number of containers included in the respective frame structures. Note that the signal Rv and the signal Fw may have the same or different container sizes.

Figure 6:
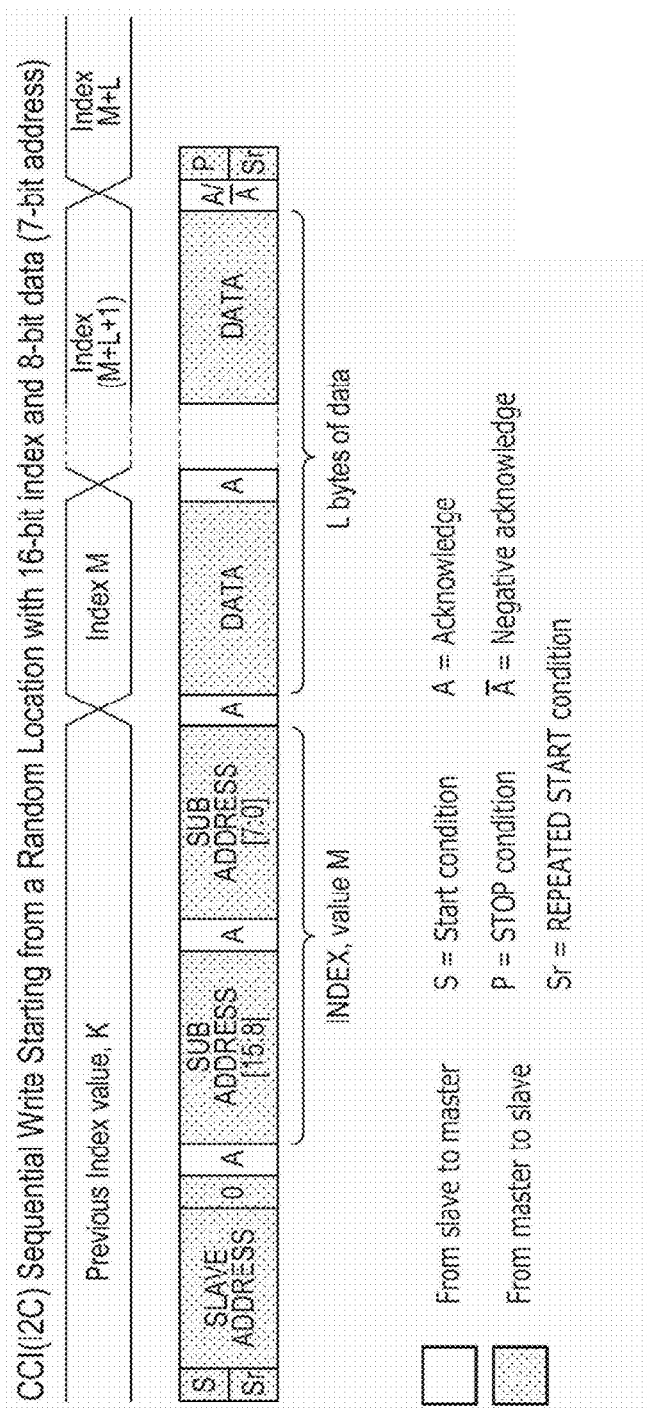
FIG. 6 is a diagram showing a protocol of I2C communication during Random Write.

Next, the case where Random Write is performed from the Master 21 to the Slave 22 will be described. In the case where the Master 21 performs Random Write to the Slave 22, the Master 21 transmits a command set to the Master SerDes 7 through I2C communication. The protocol of I2C communication when performing Random Write is one shown in FIG. 6. In accordance with this protocol, the Master 21 transmits a command set to the Master SerDes 7.

Figure 7:
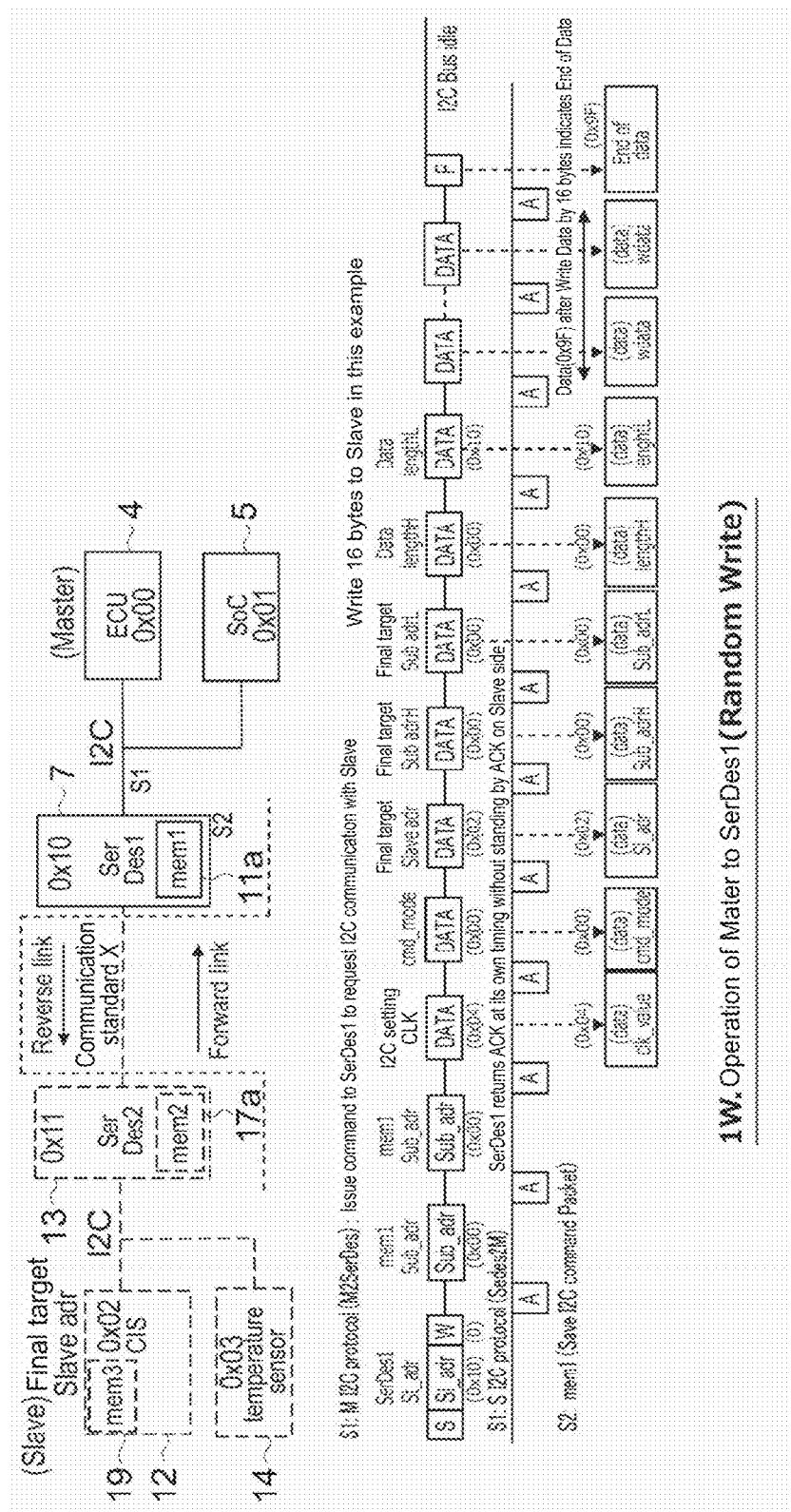
FIG. 7 is a diagram showing a signal transmitted/received between the Master and the Master SerDes.

FIG. 7 is a diagram showing a signal transmitted/received between the Master 21 and the Master SerDes 7. In the present specification, the signal of the I2C protocol from the Master 21 to the Master SerDes 7 is referred to as the M I2C protocol (M2SerDes). As shown in FIG. 7, the M I2C protocol includes S (START condition), SerDes1 St_adr, W, mem1 Sub_adr, mem1 Sub_adr, I2C setting CLK, Cmd_mode, final target Slave adr, final target Sub adrH, final target Sub adrL, Data lengthH, Data lengthL, Data×2, and P (STOP condition). Details of these pieces of information will be described below.

The data in the I2C protocol transmitted from the Master 21 is stored in the table1 in the mem1 of the Master SerDes 7. FIG. 8 is a diagram showing an example of the data stored in the table1 in the mem1. Regarding each pieces of data, CLK_value that indicates a set value of the I2C setting clock CLK is stored in the address of the mem1 represented by the Sub_Adr transmitted by the M I2C protocol, and subsequent pieces of data transmitted by the M I2C protocol are stored in the addresses of the mem1, which are respectively incremented. The CLK_value is information of one byte, which indicates the SCL frequency as described above, and the Slave 22 performs I2C communication with the Slave SerDes 13 at the operation frequency specified by the CLK_value.

Figure 9:
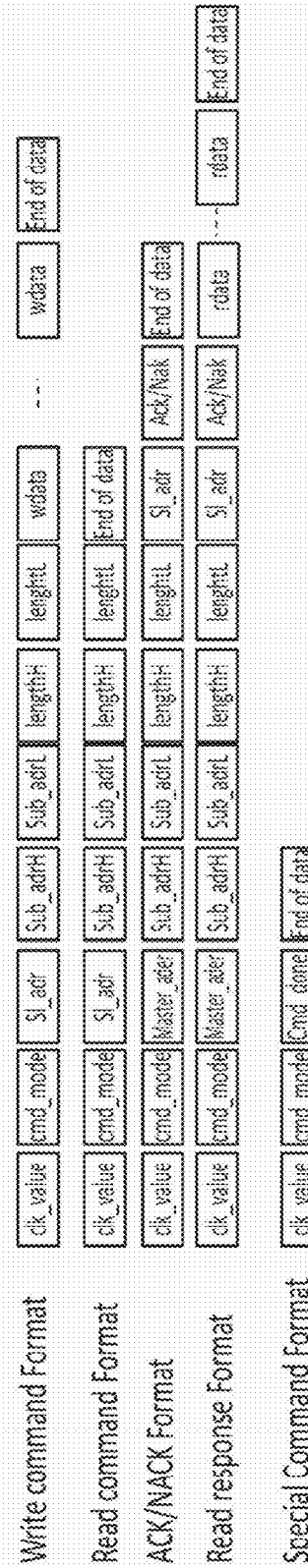
FIG. 9 is a diagram showing the meaning of each bit in one byte of Cmd_mode.

The Cmd_mode of the Sub_Adr[1] is information of one byte, which indicates the content of a command that the Master SerDes 7 has received from the Master 21. FIG. 9 is a diagram showing the meaning of each bit in the one byte of the Cmd_mode. The lower three bits [2:0] of the one byte of the Cmd_mode indicate the following information in accordance with the value of the bit strings. 000 indicates the transmission format of a write command. 001 indicates the transmission format of a read command. 010 indicates the transmission format of an ACK/NACK signal. 011 indicates the transmission format of a read or response. 1XX indicates the transmission format of a special command, and the operation is determined by the value of the data of one byte transmitted subsequent to the Cmd_mode. In this embodiment, by writing 0xFF indicating the cmd_done described below, which is defined as a special command, it is indicated that batch transmission by cmd_done is performed as described below.

In the case where the Cmd_mode[3] is 0, it indicates random location. For example, in the case where the Slave 22 is the image sensor 12, it indicates (random) access to arbitrary Sub_adr of the mem3 in the image sensor 12 or arbitrary Sub_adr of the memory in the temperature sensor 14.

In the case where the Cmd_mode[3] is 1, it indicates current location. That is, it indicates "sequential" access to the last Sub_adr+1 of the written or read memory, e.g., "M+1" when Sub_adr that was finally written or read to the mem3 in the image sensor 12 in the case where the target Slave 22 is the image sensor 12 is represented by "M".

The Cmd_mode[4] is Reserved and is not specified at this time.

In the case where the Cmd_mode[6] is 0, it indicates normal. In the case where the Cmd_mode[6] is 1, it indicates retry. At this time, it indicates to instruct the Slave 22 to retransmit a Write or Read command set in the case where the Slave SerDes 13 has received a NACK signal from the Slave 22.

In the case where the Cmd_mode[7] is 0, it indicates to instruct to determine, in the case of receiving the finishing determination P (STOP condition) at the End of data, that the signal of the I2C protocol transmitted from the Master 21 has ended. In the case where the Cmd_mode[7] is 1, it indicates to instruct to determine the end with the End of data and cmd_done. More specifically, it indicates to instruct to determine, in the case of receiving the P (STOP condition) after receiving the cmd_done, that the signal of the I2C protocol transmitted from the Master 21 has ended.

The Slave Adr of the Sub_Adr[2] in the table1 in FIG. 8 is information of one byte, which indicates the address (e.g., 0x02 in the case of the image sensor 12) of the Slave 22 to be written or read.

The Sub_adrH of the Sub_Adr[3] is information of the upper one byte of the address, which indicates which Sub_adr of the mem 19 (mem 3) in the image sensor 12 is accessed or which Sub_adr of the mem 20 in the temperature sensor 14 is accessed.

The Sub_adrL of the Sub_Adr[4] is information of the lower one byte of the address, which indicates which Sub_adr of the mem 19 (mem 3) in the image sensor 12 is accessed or which Sub_adr of the mem 20 in the temperature sensor 14 is accessed.

The LengthH of the Sub_Adr[5] is information of the upper one byte of the data length of wdata (Data[N−2:7]). The LengthL of the Sub_Adr[6] is information of the lower one byte of the data length of the wdata(Data[N−2:7]).

The wdata of the Sub_Adr[N−2:7] is data to be written to the Slave 22 or data to be read from the Slave 22. Data of one byte is stored for each bit of the Sub_Adr.

0x9F is written to the End of Data of the Sub_Adr[N−1] in the case of receiving the P (STOP condition) from the Master 21. As the default, an initial value such as 0x00 has been written.

FIG. 10 is a diagram showing types and bit strings of I2C commands transmitted in accordance with the communication standard X protocol. In FIG. 10, ACK is an acknowledge and indicates that processing has been normally completed. NACK is a negative acknowledge and indicates that processing has not been normally completed.

Repeated_start is a start flag indicating that the signal of the I2C protocol continues. Specifically, it corresponds to Sr in the I2C combined format shown in FIG. 6. It is a flag issued before, in the case where I2C communication from the Master 21 to the Master SerDes 7 is started (S (START condition) is started) and then the next I2C communication is started without finishing the I2C communication (without issuing P (STOP condition)), the next I2C communication is started.

The End of data in the I2C command transmitted in accordance with the communication standard X protocol indicates P (STOP condition). IN the case where Cmd_mode[7]=0, it indicates that the signal of the I2C protocol from the S (START condition) to the P (STOP condition) is transmitted to the Slave SerDes 13.

The cmd_done in the I2C command transmitted in accordance with the communication standard X protocol is a special command in the case where Cmd_mode[7]=1 and the next data is 0xFF. The cmd_done is information for instructing to transmit one or more sets to the Slave SerDes 13, one set being the signal of the I2C protocol from the S (START condition) to the P (STOP condition).

Rsv_command in the I2C command transmitted in accordance with the communication standard X protocol is Reserved and is not specified at this time. The data in the I2C command indicates data to be written to the Slave 22 or data to be read from the Slave 22.

Although an example in which the I2C command transmitted in accordance with the communication standard X protocol is represented by eight bits has been shown in FIG. 10, the present disclosure is not limited thereto and the I2C command may be represented by nine bits or more. For example, in the case where the I2C command is represented by nine bits, by setting one bit on the MSB side to "0" when the signal of the I2C protocol is "data" and setting one bit on the MSB side to "1" when the signal of the I2C protocol is other than "data", it is possible to easily determine whether the signal of the I2C protocol is "data" or otherwise.

In the present specification, the address of each device is assigned as follows as an example as a precondition for data communication between the Master 21 and the Slave 22 in the communication system 3 in FIG. 1. The address of the ECU 4 is 0x00, the address of the SoC 5 is 0x01, the address of the Master SerDes 7 is 0x10, the address of the Slave SerDes 13 is 0x11, the address of the image sensor 12 is 0x02, and the address of the temperature sensor 14 is 0x03.

In the present specification, transmission of the signal of the I2C protocol from the Master 21 to the Master SerDes 7 is referred to as the M I2C protocol (M2SerDes) (Step S1). As shown in FIG. 7, the S (START condition) in the M I2C protocol (M2SerDes) indicates start of the I2C protocol signal from the Master 21 to the Slave 22. The I2C protocol specifies that the "S", "Sl_adr", "W (Write) or R (Read)", and "Sub_adr" are transmitted in order.

The SerDes1 St_adr (Sl_adr(0x10)) means to specify, as an address, 0x10 that is the address of the Master SerDes 7. W indicates a write command.

The mem1 Sub_adr (Sub_adr(0x00)) indicates to specify "0x00" as upper bits of the Sub_adr of the mem 11a.

The mem1 Sub_adr (Sub_adr(0x00)) is information for specifying "0x00" as lower bits of the Sub_adr of the mem 11a. That is, it indicates that the Master 21 specifies to access "0x0000" of the mem 11a.

The I2C setting CLK (DATA(0x04)) indicates to specify "0x04 (400 kHz)" as the CLK_value.

The Cmd_mode (DATA(0x00)) indicates to specify the Cmd_mode[7:0]=0x00.

The final Slave adr (DATA(0x02)) indicates to specify "0x02" as the address of the target Slave 22. Since it is "0x02", it indicates that the Master 21 has selected the image sensor 12.

The final target Sub adrH (DATA(0x00)) indicates to specify "0x00" as upper bits of the Sub_adr of the mem3 (to be finally accessed) in the image sensor 12.

The final target Sub adrL (DATA(0x00)) indicates to specify "0x00" as lower bits of the Sub_adr of the mem3 (to be finally accessed) in the image sensor 12. That is, it indicates that the Master 21 has specified to access "0x0000" of the mem3.

The Data lengthH (DATA(0x00)) indicates to specify "0x00" as upper bits of the value representing the data length of the subsequent data.

The Data lengthL (DATA(0x10)) indicates to specify "0x10" as lower bits of the value representing the data length of the subsequent data. That is, length[15:0]=0x0010, which indicates that the Master 21 has specified 16 bytes.

(DATA×2): data of 16 bytes is transmitted.

The P (STOP condition) indicates to clarify that the signal of the I2C protocol from the Master 21 to the Slave 22 has ended.

In parallel with data transmission of the M I2C protocol from the Master 21 to the Master SerDes 7, the Master SerDes 7 starts transmitting information of the table1 stored in the mem 11a shown in FIG. 8 to the Slave SerDes 13 and transmits an ACK signal to the Master 21 in accordance with the S I2C protocol (SerDes2M) (Step S1). The Master SerDes 7 returns an ACK signal to the Master 21 every time the Master SerDes 7 receives each byte constituting the signal of the I2C protocol from the Master 21.

For the Master 21, the SCL low period extended by the Master SerDes 7 can be shortened because an ACK signal is immediately returned. However, the SCL low period has a lower limit and cannot be set to zero. This is because the SCL low represents the period in which the SCL (I2C clock signal) is Low and the SCL does not function as an I2C clock signal if the SCL low is less than the lower limit.

The Master SerDes 7 writes, to the table1 in FIG. 8, the signal based on the signal of the I2C protocol from the Master 21 to the Master SerDes 7, i.e., the I2C protocol signal transmitted from the Master 21 to the Master SerDes 7. For example, the Master SerDes 7 writes the following data conversion information to the table1 in FIG. 8. This will be referred to as the mem1 (Save I2C command packet) (Step S2).

Regarding (data)CLK_value(0x04), "0x04 (400 kHz)" is written as the CLK_value. Regarding (data)Cmd_mode (0x00), Cmd_mode[7:0]=0x00 is written. Regarding (data)

sl_adr(0x02), "0x02" is written as the address of the target Slave 22. Since it is "0x02", the image sensor 12 has been selected. Regarding (data)Sub_adrH(0x00), "0x00" is written as upper bits of the Sub_adr of the mem3 (to be finally accessed) in the image sensor 12. Regarding (data)Sub_adrL (0x00), "0x00" is written as lower bits of the Sub_adr of the mem3 (to be finally accessed) in the image sensor 12. Regarding (data)lengthH(0x00), "0x00" is written as upper bits of the value representing the data length of the subsequent data. Regarding (data)lengthL(0x10), "0x10" is written as lower bits of the value representing the data length of the subsequent data. For example, length[15:0]=0x0010, and being 16 bytes is written. Regarding (data)wdatax2, data of 16 bytes is written. Regarding End of data, "0x9F" is written.

Figure 11:
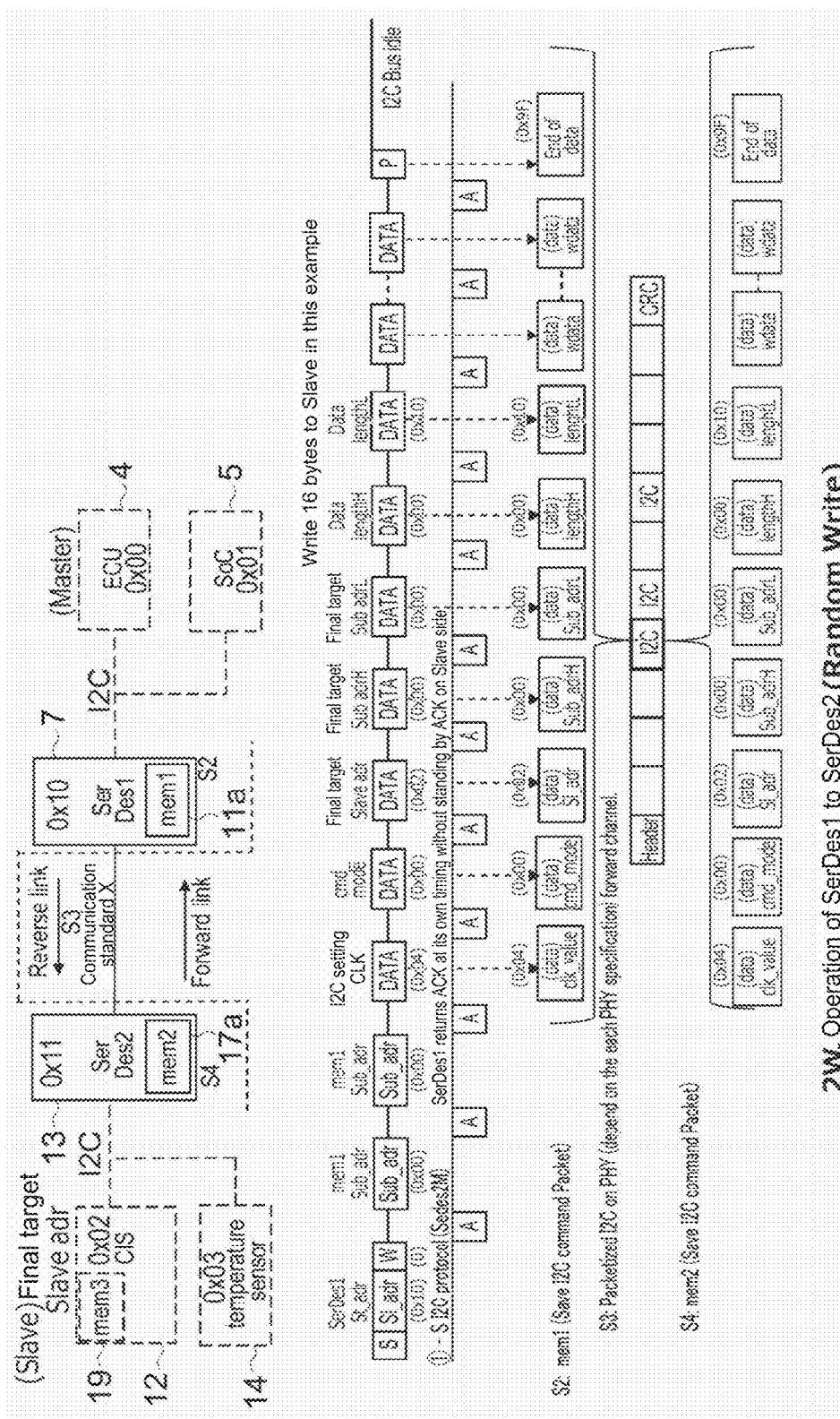
FIG. 11 is a diagram showing processing of transmitting a Random Write Command from the Master SerDes to the Slave SerDes in accordance with a communication standard X.

FIG. 11 is a diagram that follows FIG. 7 and shows processing of transmitting a Random Write Command from the Master SerDes 7 to the Slave SerDes 13 in accordance with the communication standard X. The S I2C protocol (Sedes2M) and the mem1 (Save I2C command Packet) (Steps S1 and S2) in FIG. 11 are the same as those described in FIG. 7.

The Master SerDes 7 reads the data of the table1 in FIG. 8, protocol-converts the read data into a signal of the communication standard X protocol, and transmits the obtained signal to the Slave SerDes 13 via a Packetized I2C on PHY (depend on the each PHY specification) forward channel (Step S3).

In the case where Cmd_mode=0x00, Cmd_mode[7]=0, which indicate to "determine the end for each End of data". Therefore, upon receiving "End of data(0x9F)", the LINK 11 of the Master SerDes 7 writes "End of data(0x9F)" to the table1 in FIG. 8, reads the table1 in FIG. 8, and transmits the read data to the Slave SerDes 13 via the Rv.Tx 10.

In the case where Cmd_mode=0x80, the pieces of data in the mem1 (table1 in FIG. 8) are collectively I2C-command-converted when the End of data and cmd_done are written, and transmitted to the Slave SerDes 13 via the Rv.Tx 10.

The Slave SerDes 13 extracts an I2C command packet from the received signal of the communication standard X protocol, and writes the extracted I2C command packet to the table3 in the mem2. This is called the mem2 (Save I2C command Packet) in FIG. 11 (Step S4). FIG. 12 is a diagram showing an example of the table3 in the mem2 during a Random Write operation. Information having the same content as that of the table1 in FIG. 8 is written to the table3.

The Slave SerDes 13 protocol-converts the received data of a Reverse link and restores, in the mem2, the original stored data of the mem. The Slave SerDes 13 determines the end of restoration of the I2C command packet by the restoration of End of data.

Figure 13:
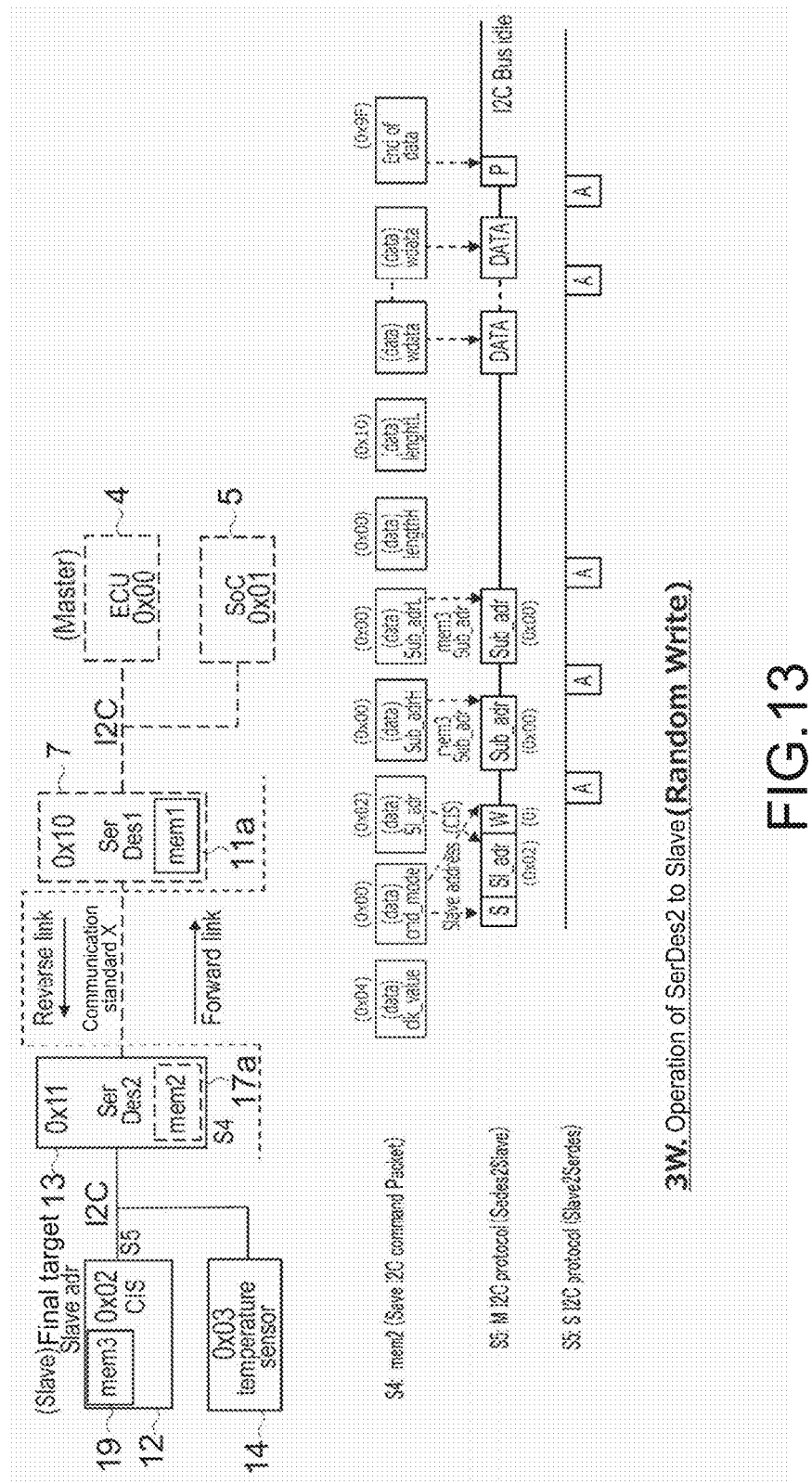
FIG. 13 is a diagram showing processing of transmitting data from the Slave SerDes to the Slave through I2C communication.

FIG. 13 is a diagram that follows FIG. 11 and shows processing of transmitting data from the Slave SerDes 13 to the Slave 22 through I2C communication. The mem2 (Save I2C command Packet) in FIG. 11 (Step S4) is the one described in FIG. 11.

Upon writing End of data to the table3 in the mem2 shown in FIG. 12, the Slave SerDes 13 reads the table3, format-converts the read data into a signal of the I2C protocol, and transmits the obtained signal to the Slave 22 via the I2C 13a in accordance with an M I2C protocol (Sedes2Slave) (Step S5).

Regarding the (data)Cmd_mode(0x00), S (START condition) is issued and a W (Write) command or a R (Read) command is generated depending on the value of Cmd_mode[0] after next Sl_adr is issued.

The (data)Sl_adr(0x02) indicates to specify "0x02" as the above-mentioned Sl_adr. Since it is "0x02", the image sensor 12 has been selected. The (data)Sub_adrH(0x00) indicates to specify "0x00" as the upper bit of the address of the mem3 (to be finally accessed) in the image sensor 12. The (data)Sub_adrL(0x00) indicates to specify "0x00" as the lower bit of the address of the mem3 (to be finally accessed) in the image sensor 12. The (data)wdatax2 indicates data of 16 bytes.

The Slave 22 sequentially returns an ACK signal indicating that the signal has been received normally to the Slave SerDes 13 in accordance with an S I2C protocol (Slave2SerDes) (Step S5).

Note that information similar to that in FIG. 12 is stored in the table3 in the mem2 while the Slave SerDes 13 transmits data to the Slave 22 through I2C communication.

The Slave SerDes 13 respectively writes ACK and NACK to Sub_Adr=N of the table3 in the case where Cmd_mode [6]=0 and all signal returned from the Slave 22 are ACK signals and in the case where all the signals include one or more NACK signals.

The Slave SerDes 13 writes ACK to Sub_Adr=N of the table3 in the case where Cmd_mode[6]=1 and all signals returned from the Slave 22 are ACK signals, and perform rewriting in the case where all the signals include one or more NACK signal. In the case where the NACK signal has been received also at the second time, the Slave SerDes 13 writes NACK to Sub_Adr=N of the table3. FIG. 15 shows the storage area state of the mem2 before releasing the storage area in response to a Random Write Command, in which ACK or NACK has been written to Sub_Adr=N after I2C communication between the Slave SerDes 13 and the Slave 22 is completed.

As a method of generating ACK or NACK to be written to Sub_Adr=N of the table3 in the mem2, for example, the logical product of an ACK signal and a NACK signal returned from the Slave 22 may be taken.

Figure 14:
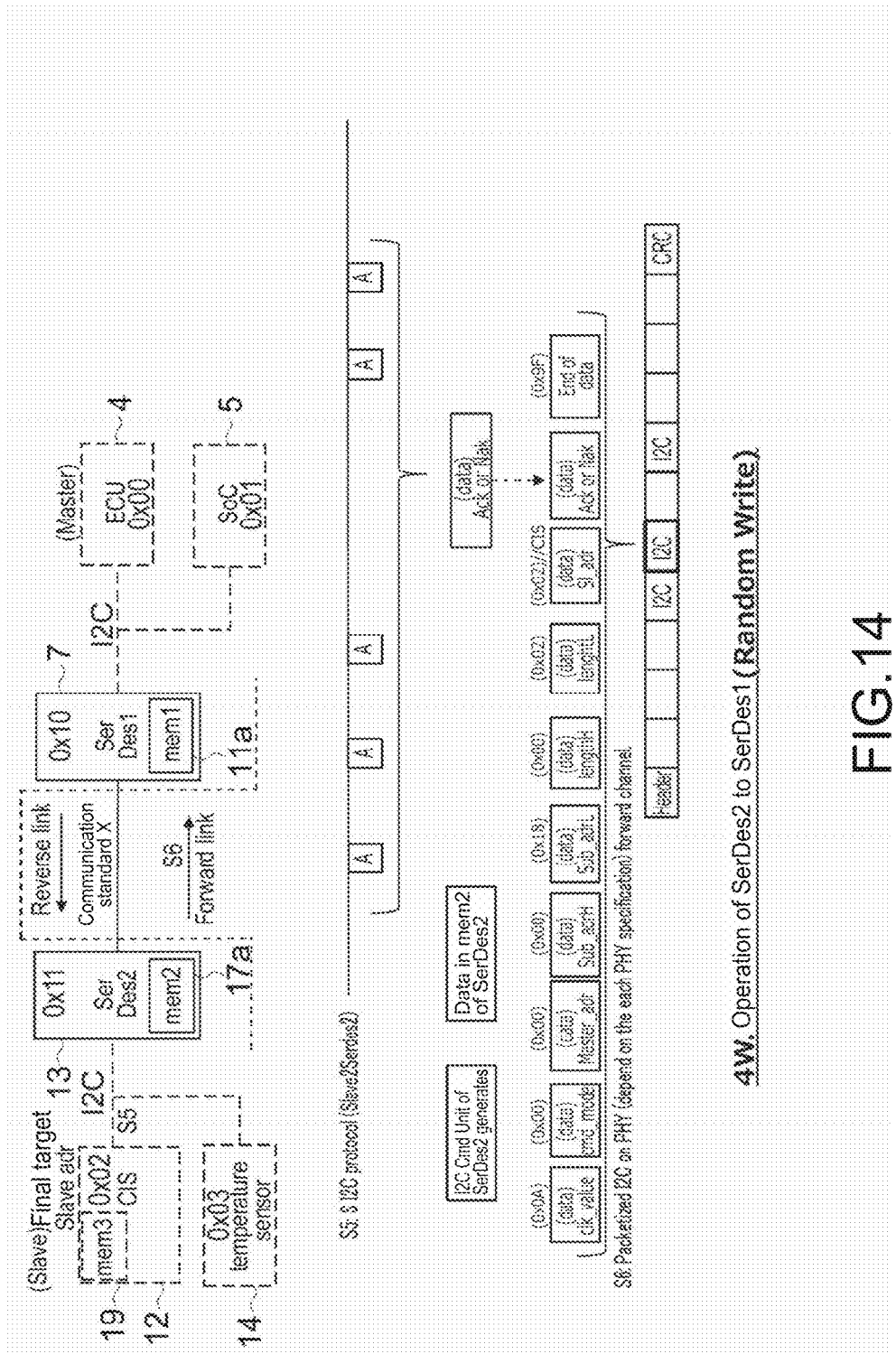
FIG. 14 is a diagram showing processing of transmitting, from Slave SerDes to the Master SerDes, a response to the Random Write Command in accordance with the communication protocol X.

FIG. 14 is a diagram that follows FIG. 13 and shows processing of transmitting a response to the Random Write Command from the Slave SerDes 13 to the Master SerDes 7 in accordance with the communication protocol X. The S I2C protocol (Slave2SerDes) in FIG. 14 (Step S5) is the one described in FIG. 13.

The Slave SerDes 13 protocol-converts the result of I2C communication with the Slave 22 into a signal of the communication standard X protocol, and transmits the obtained signal to the Master SerDes 7 via the Packetized I2C on PHY (depend on the each PHY specification) forward channel (Step S6). Upon writing ACK or NACK to Sub_Adr=N of the table3 in the mem2, the Slave SerDes 13 reads the table3 (from 0 to N of Sub_Adr) and transmits necessary information (Data[7:0] in the case where Sub_Adr is 2 and N in this embodiment, including also Cmd_ID in the case where Cmd_mode is extended to two bytes) to the Master SerDes 7. Upon completing the transmission, the Slave SerDes 13 releases the storage area of the mem2 shown in FIG. 15.

Here, since the mem1 and the mem2 occupy the same memory area (Sub_Adr=0 to N−1), the Slave SerDes 13 knows Sub_Adr (vacant in the mem2 and to which ACK/ NACK has been written) to be written next of the mem1. Further, the Slave SerDes 13 understands that there is a need to return two bytes (the Slave adr with which I2C communication has been performed and the result of the I2C communication) to the Master SerDes 7 in the case where the Slave SerDes 13 itself has performed writing on the Slave 22.

Figure 16:
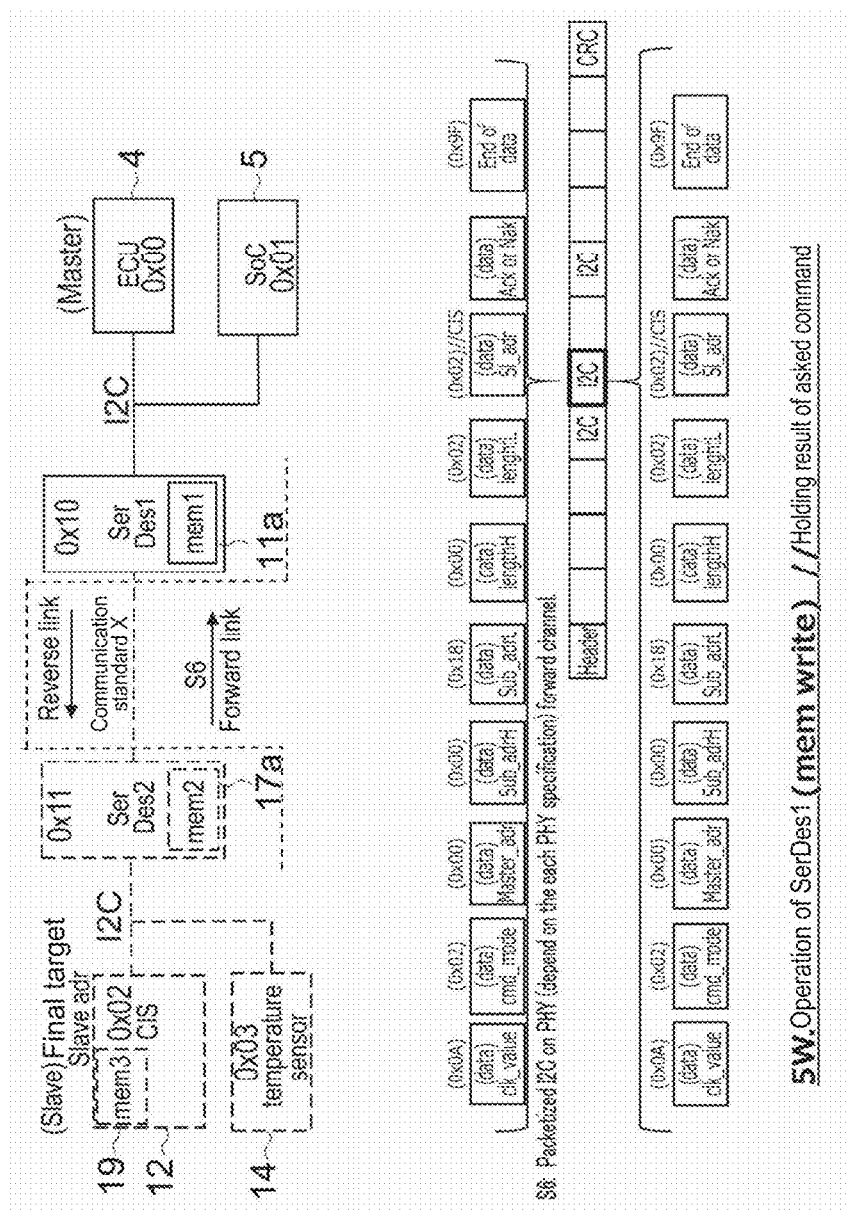
FIG. 16 is a diagram showing an operation of the Master SerDes.

FIG. 16 is a diagram that follows FIG. 14 and shows the operation of the Master SerDes 7. The Packetized I2C on PHY (depend on the each PHY specification) forward channel in FIG. 16 (Step S6) is the one described in FIG. 14. The Master SerDes 7 extracts an I2C command packet from the signal of the communication standard X protocol received from the Slave SerDes 13, and writes the extracted I2C command packet to N to N+9 of Sub_Adr of the table1 in the mem1.

FIG. 17 is a diagram showing the table1 in the mem1 after receiving response data from the Slave SerDes for the Random Write Command. The I2C command packet generated by the I2C Cmd Unit in the Slave SerDes 13 in FIG. 14 is stored in N to N+6 and N+9 of sub_Adr of the table1. Further, Slave adr of sub_Adr(2) in the mem2 and the content of ACK or NACK of sub_Adr(N), which has been read and transferred, are stored in N+7 and N+8 of sub_Adr of the table1 in FIG. 17.

Figure 18:
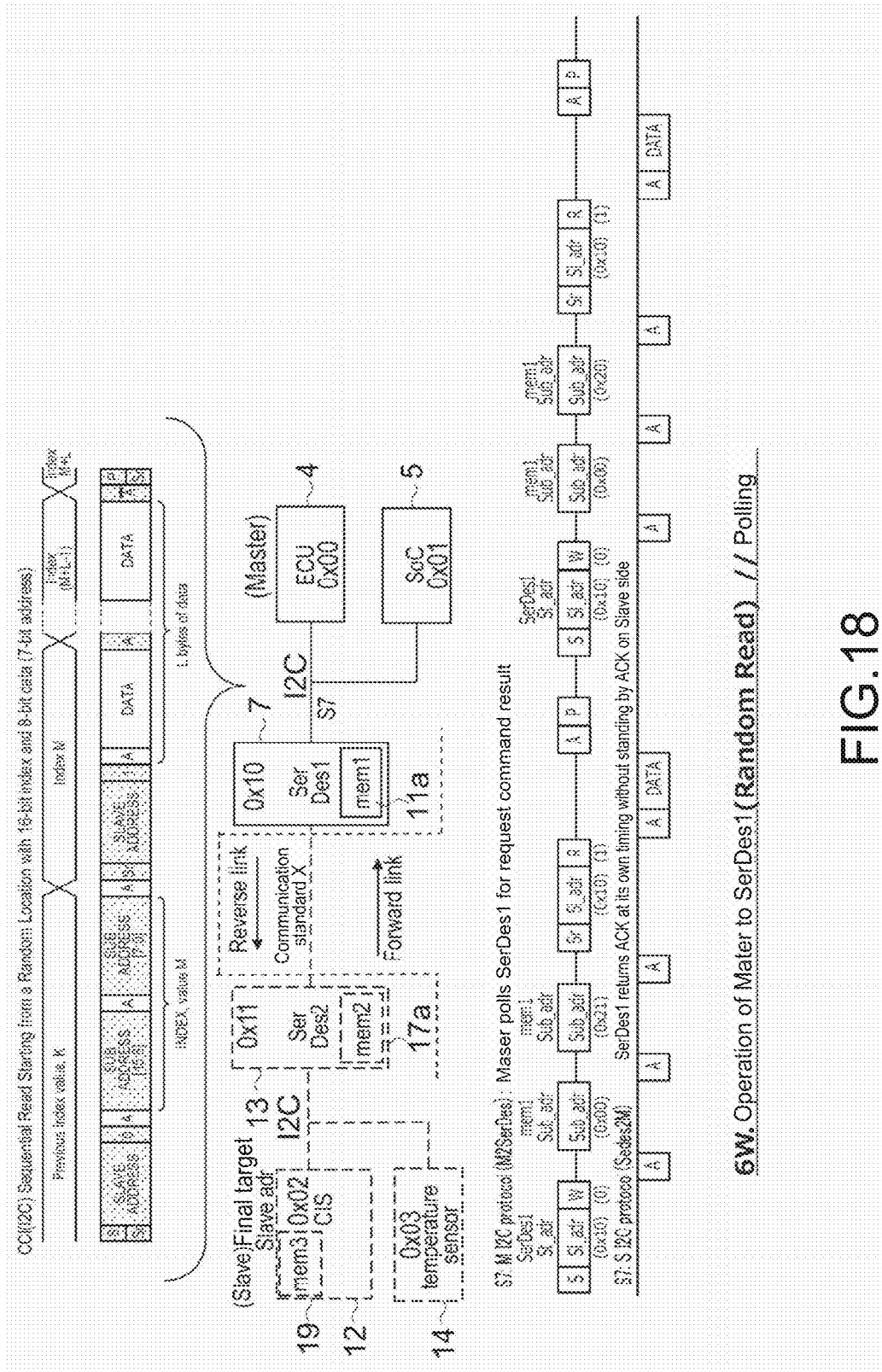
FIG. 18 is a diagram showing processing in the case where the Master polls Master SerDes for the Random Write Command and reads the execution result.

FIG. 18 is a diagram showing processing in the case where the Master 21 polls Master SerDes 7 for the Random Write Command and read the execution result. the Master 21 polls the SerDes1 for the request command result in accordance with the M I2C protocol (M2SerDes) (Step S7). The Master 21 polls Sub_Adr=N+9 in the table1 and reads, in the case where it is 0x9F, Sub_Adr=N+8 to determine whether it is ACK/NACK.

For example, in the case where "writing of 16 bytes to the Slave 22" for which the Master SerDes 7 is requested has been completed, End of Data (0x9F) and ACK(0x81) that is the result thereof can be read. Note that although the result of End of Data is referred to by one byte read to determine polling and ACK or NACK is read by one byte read again in this example, the polling result and the result of I2C communication with the Slave 22 may be determined by reading two bytes at a time. If NACK is returned, the Slave 22 is capable of checking, by reading Slave adr of Sub_adr (N+7), whether or not the NACK is transmitted by the corresponding Slave 22.

FIG. 17 is a diagram showing an example of the stored data in the mem1. Since the Master 21 itself has issued a write command to the Master SerDes 7, the Master 21 knows the access point of the mem1 of the Master SerDes 7. Similarly, since the Master SerDes 7 itself stores data in the mem1, the Master SerDes 7 knows the access point of the mem1. For example, in the case where writing has been performed on the Slave 22 and the response is 2B, Header is 7 Byte+2 Bbyte+EoD(1 Byte)=10 Byte and the next Sub_Adr is N+10=34.

Figure 19:
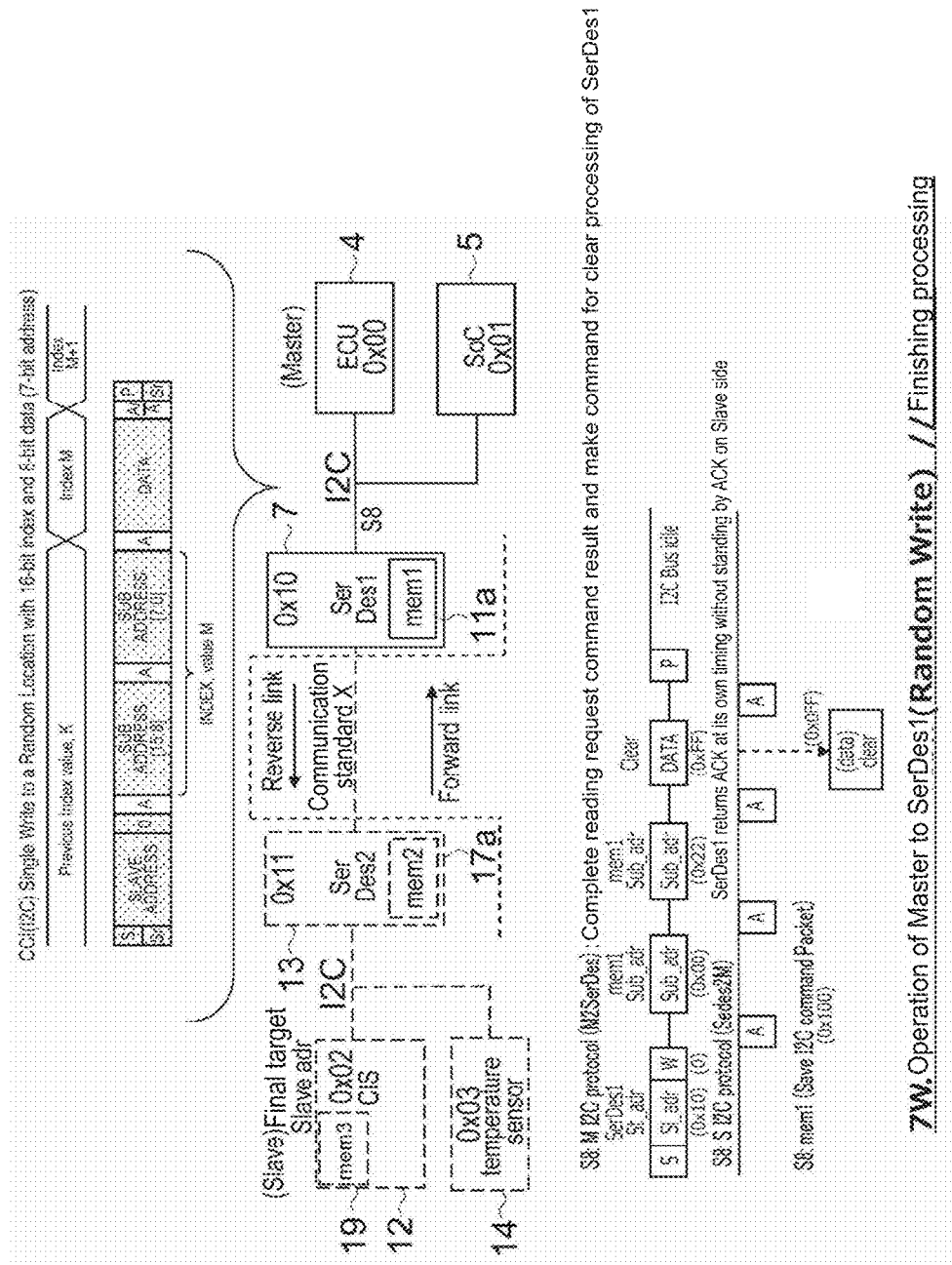
FIG. 19 is a diagram showing transmission of a signal for releasing the storage area of the mem1 from the Master to the Master SerDes as processing of finishing the Random Write operation.

FIG. 19 is a diagram showing transmission of a signal for releasing the storage area of the mem1 from the Master 21 to the Master SerDes 7 as processing of finishing the Random Write operation. FIG. 20 is a diagram showing the stored data in the mem1 before the storage area is released in response to the Random Write Command. The Master 21 performs M I2C protocol processing, S I2C protocol processing, and mem1 (Save I2C command packet) processing, reads Sub_Adr=N+8 of the table1, and writes, in the case where it is ACK, Clear to Sub_Adr=N+10 of the table1 in the mem1 as shown in FIG. 20 (Step S8). The Master SerDes 7 releases the memory area of the table1 in the mem1 in the case where this Clear is written.

The Master SerDes 7 releases, in the case where 0xFF is written to Sub_adr (N+10) in the mem1, the storage area of the mem1, which has been used, as processing of finishing the request command. Alternatively, the storage area of the mem1 may be released in accordance with a write command for initializing the memory area used by the Master 21.

Figure 21:
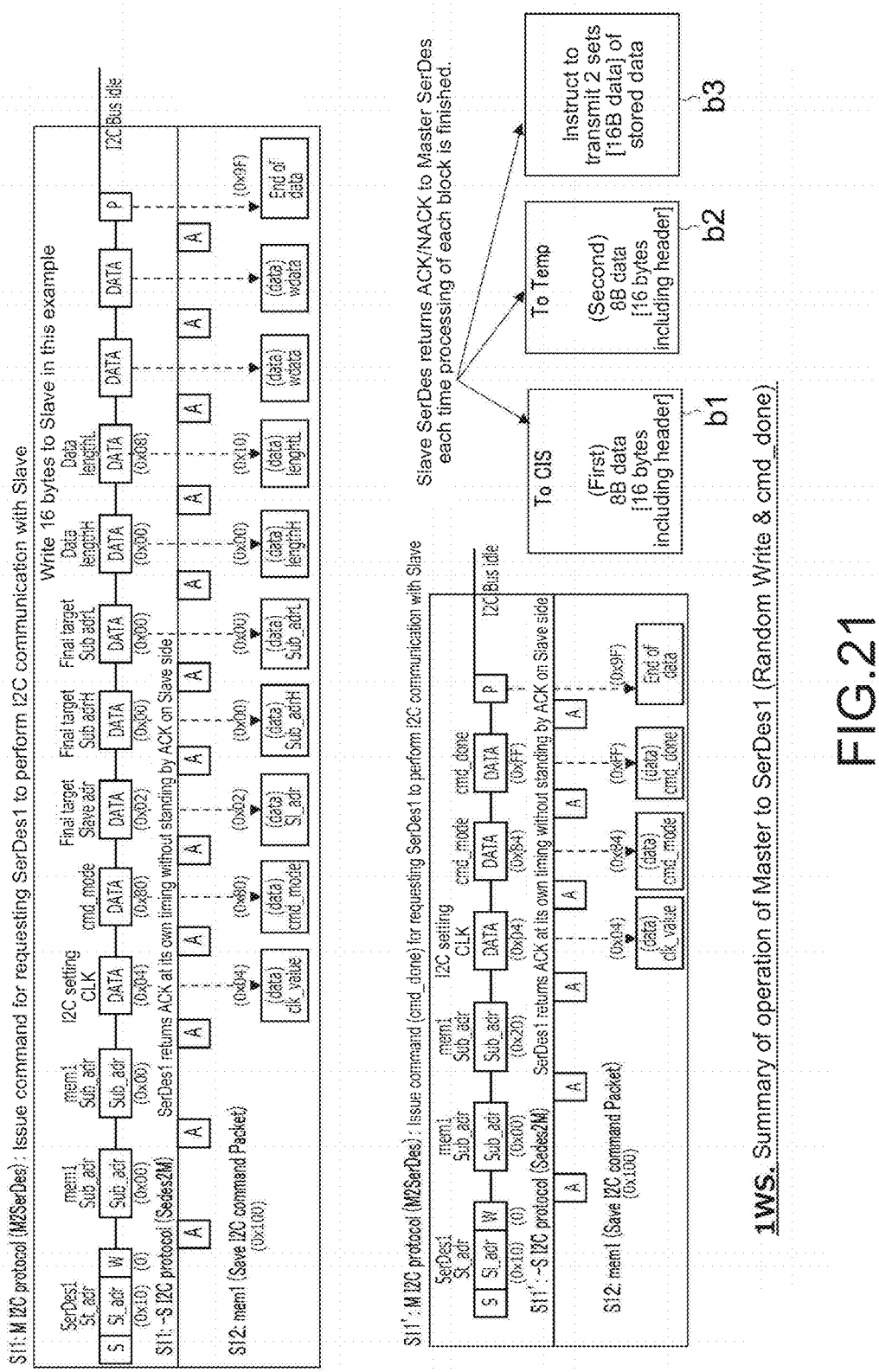
FIG. 21 is a diagram showing batch command transmission by Cmd_mode[7]=1.
Figure 22:
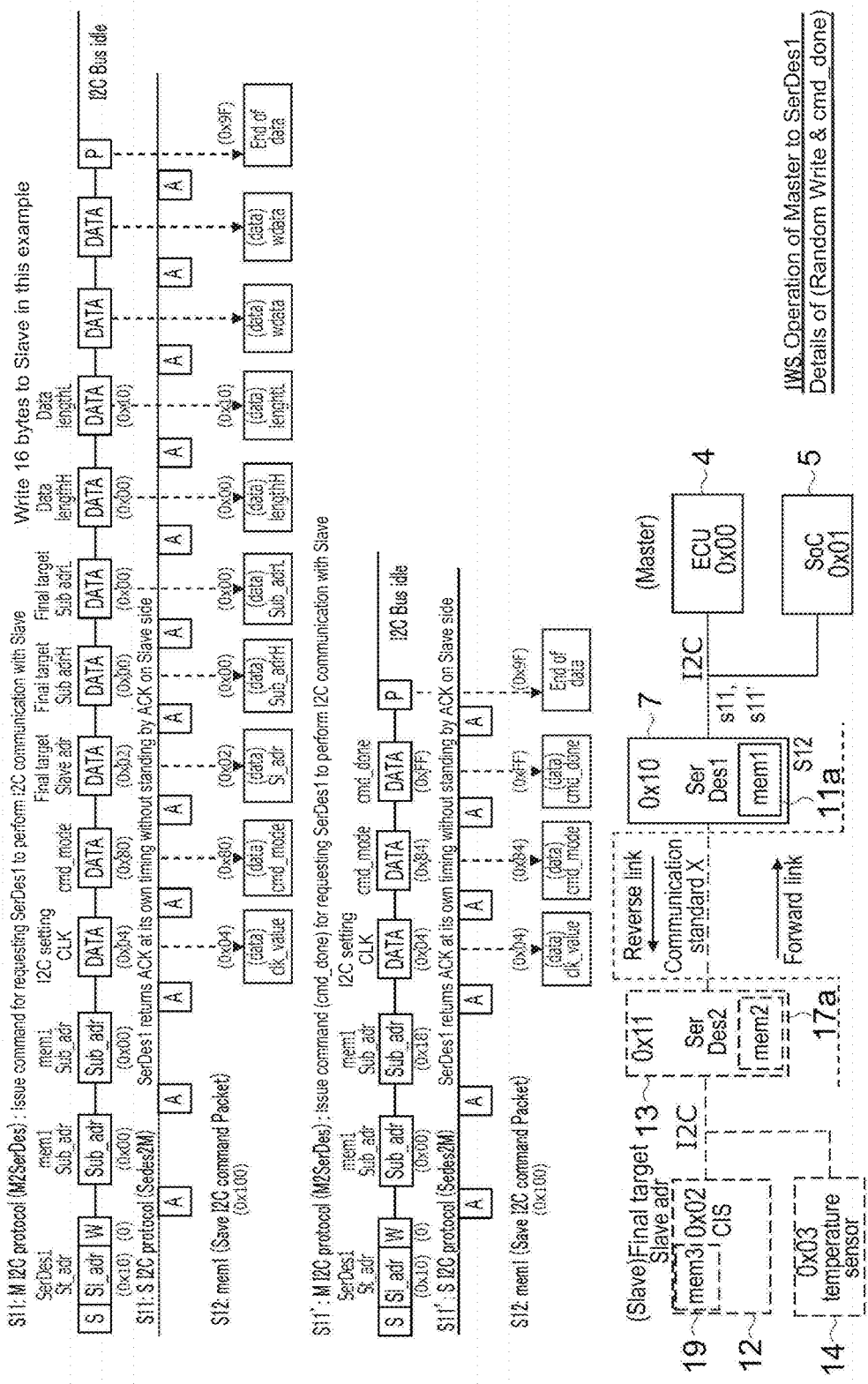
FIG. 22 is a diagram that follows FIG. 21.
Figure 23:
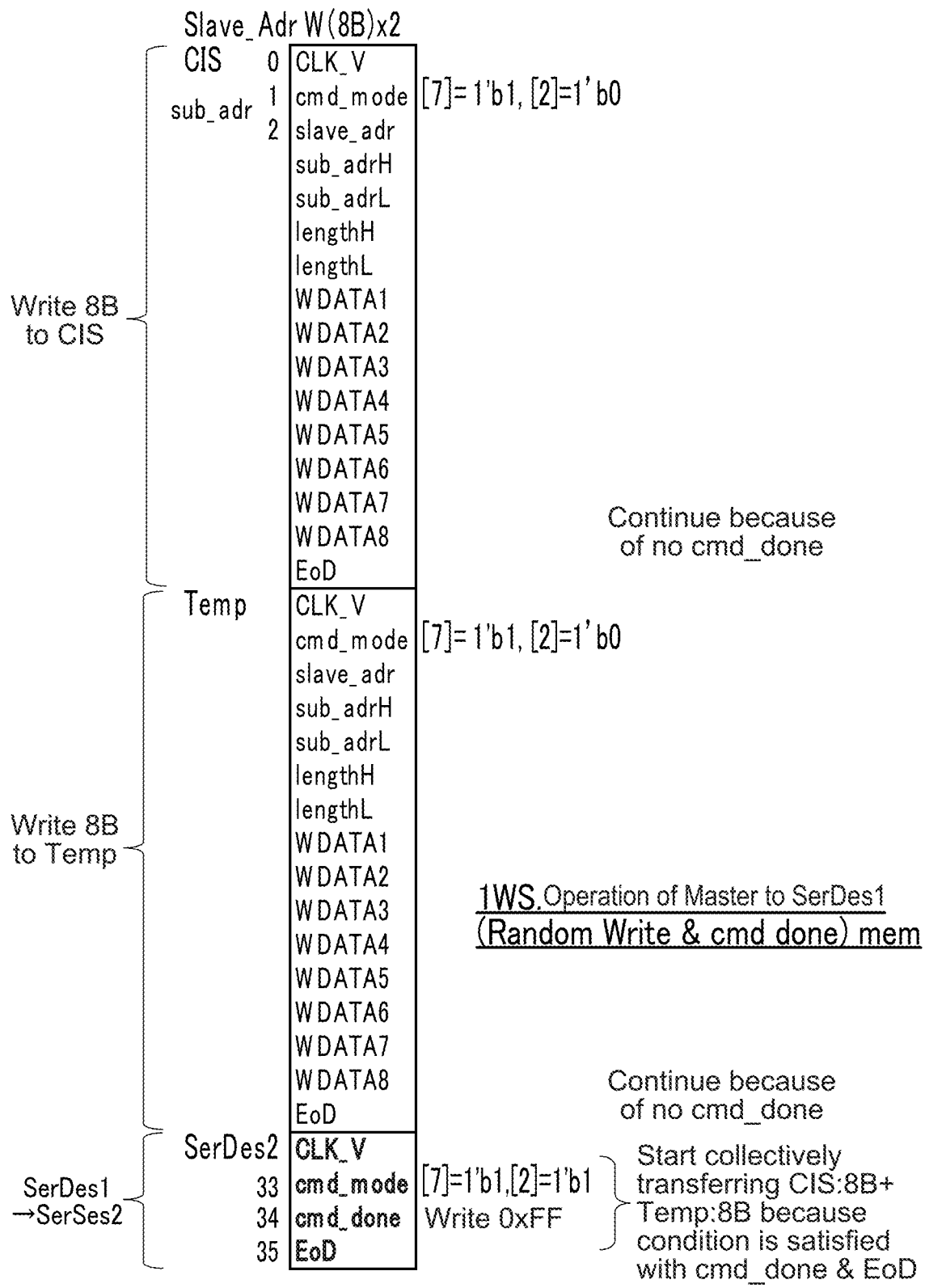
FIG. 23 is a diagram showing details of stored data in the table1 in the mem1 during the batch command transmission by the Cmd_mode[7]=1.

FIG. 21 to FIG. 23 are each a diagram showing an I2C command batch transmission operation. FIG. 21 and FIG. 22 are each a diagram showing batch command transmission by Cmd_mode[7]=1. FIG. 23 is a diagram showing details of the stored data of the table1 in the mem1 during batch command transmission by Cmd_mode[7]=1. The I2C command batch transmission operation is a write operation in the case where Cmd_mode [2:0]=000 and Cmd_mode [7]=1. Specifically, the case where the Master 21 collectively writes data of eight bytes to the image sensor 12 (Sl_adr=0x02) and the temperature sensor 14 (Sl_adr=0x03) is shown.

Block b1 in FIG. 21 indicates the Write operation of data of eight bytes to the image sensor 12 (Sl_adr=0x02), and Block b2 indicates the Write operation of data of eight bytes to the temperature sensor 14 (Sl_adr=0x03). Block b3 indicates the end of the batch operation by cmd_done and P (STOP condition).

More specifically, as shown in FIG. 21 and FIG. 22, as the operation of b1, the Master 21 issues a command for requesting the Master SerDes 7 to perform I2C communication with the Slave 22 first in accordance with the M I2C protocol (M2SerDes) (Step S11). Upon receiving the data from the Master 21, the Master SerDes 7 returns ACK at its own timing in accordance with the S I2C protocol (Step S11).

Since this request command indicates an I2C command batch operation of Cmd_mode [2:0]=000 and Cmd_mode [7]=1, transmission to the Slave SerDes 13 is not started even End of Data is stored in the mem1. The subsequent operation of b2 is the same as the operation of b1 except that Slave_adr is the temperature sensor 14 (Sl_adr=0x03).

The last b3 indicates that it is a special code with Cmd_code[2]=1, and the subsequent Data indicates a special code. In this example, by continuously receive special cmd_done (0xFF) indicating the end of the command and STOP condition (Step S12), the Master SerDes 7 collectively transmits the received data (FIG. 23) stored in the mem1 to the Slave SerDes 13 as I2C command batch transmission.

Note that in this embodiment, in the case where the Master 21 has set Cmd_mode[7]=1, Cmd_mode[7]=0 cannot be set until 0xFF is written to cmd_done after that.

FIG. 24 to FIG. 34 each show the Random Read operation (Read operation in the case where Cmd_mode [3:0]=0001 and [7]=0). The Random Read operation is largely different from the Random Write operation in the following points.

Figure 26:
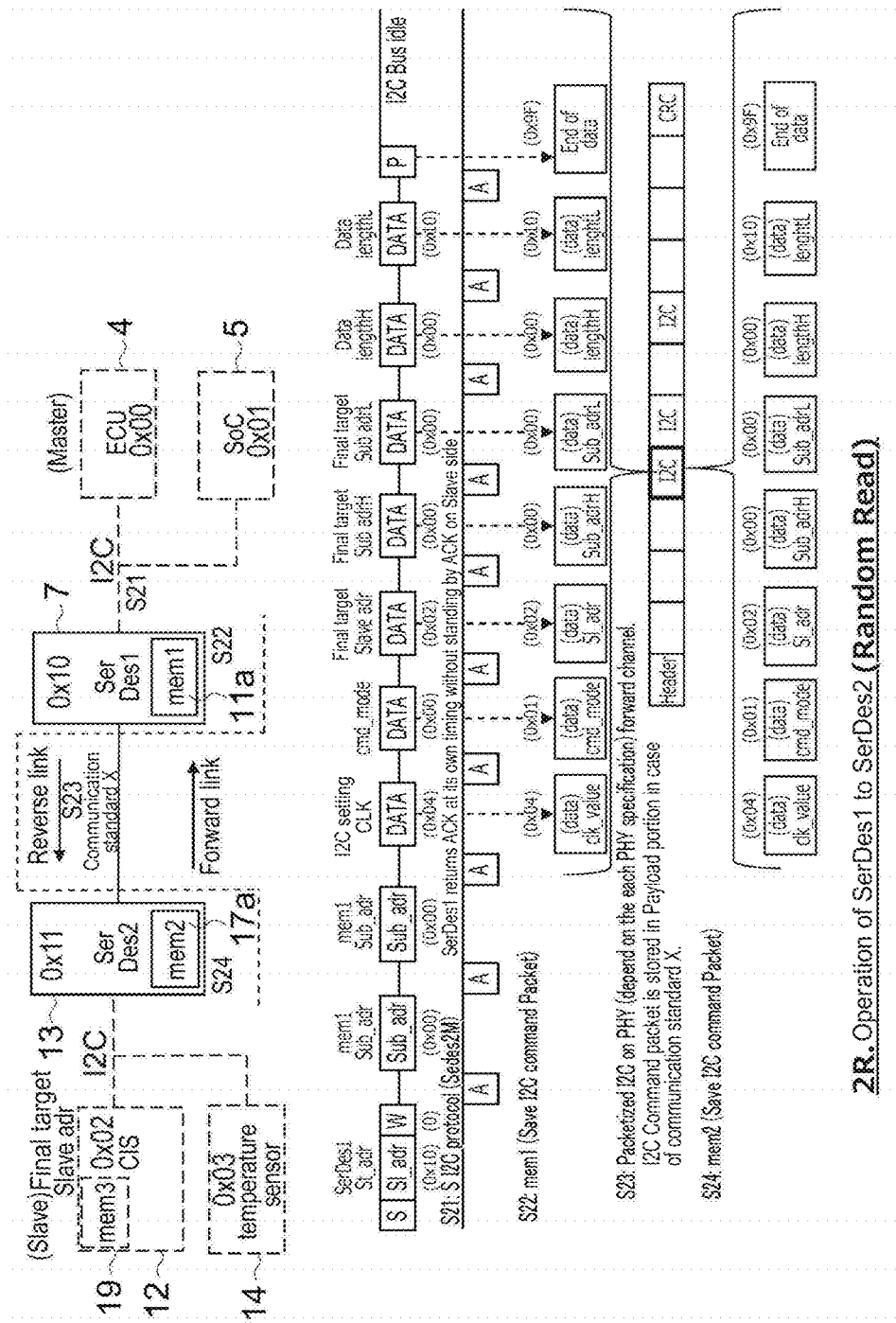
FIG. 26 is a diagram showing processing of transmitting a Random Read command from the Master SerDes to the Slave SerDes in accordance with the communication protocol X.

In the Read operation, as shown in FIG. 24 to FIG. 27, the Master 21 writes a Read request to the Master SerDes 7 first (FIG. 24 and FIG. 25), and the Master SerDes 7 writes this Read request to the Slave SerDes 13 (FIG. 26 and FIG. 27).

Figure 28A:
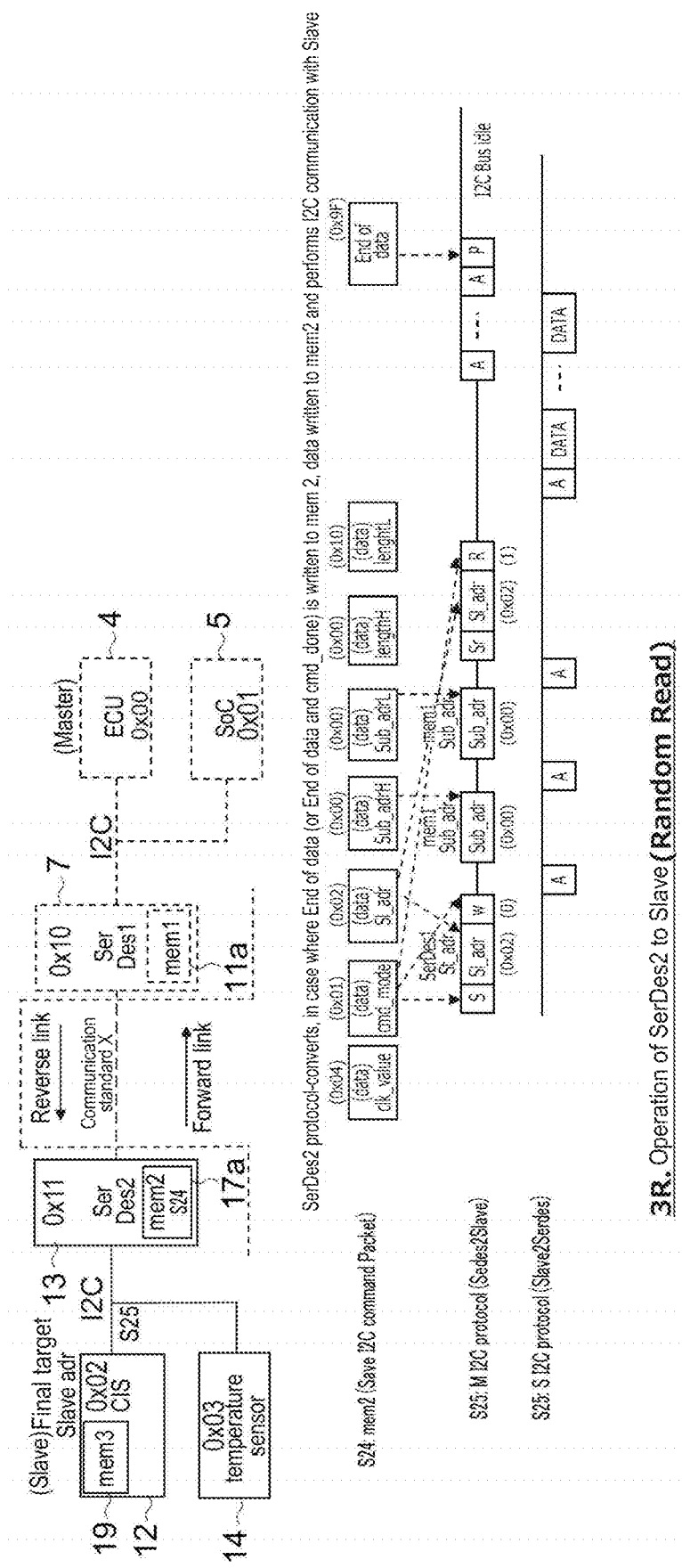
FIG. 28A is a diagram showing processing of transmitting the random read command from the Slave SerDes to the Slave.

After that, as shown in processing of the M I2C protocol (Sedes2Slave) in Step S25 of FIG. 28A and FIG. 29, writing that the processing target is the mem3 of the image sensor 12 is performed by "S", "SL_adr", "W", and "Sub_adr", and then reading is performed from the processing target by "Sr", "SL_adr", and "R".

Figure 24:
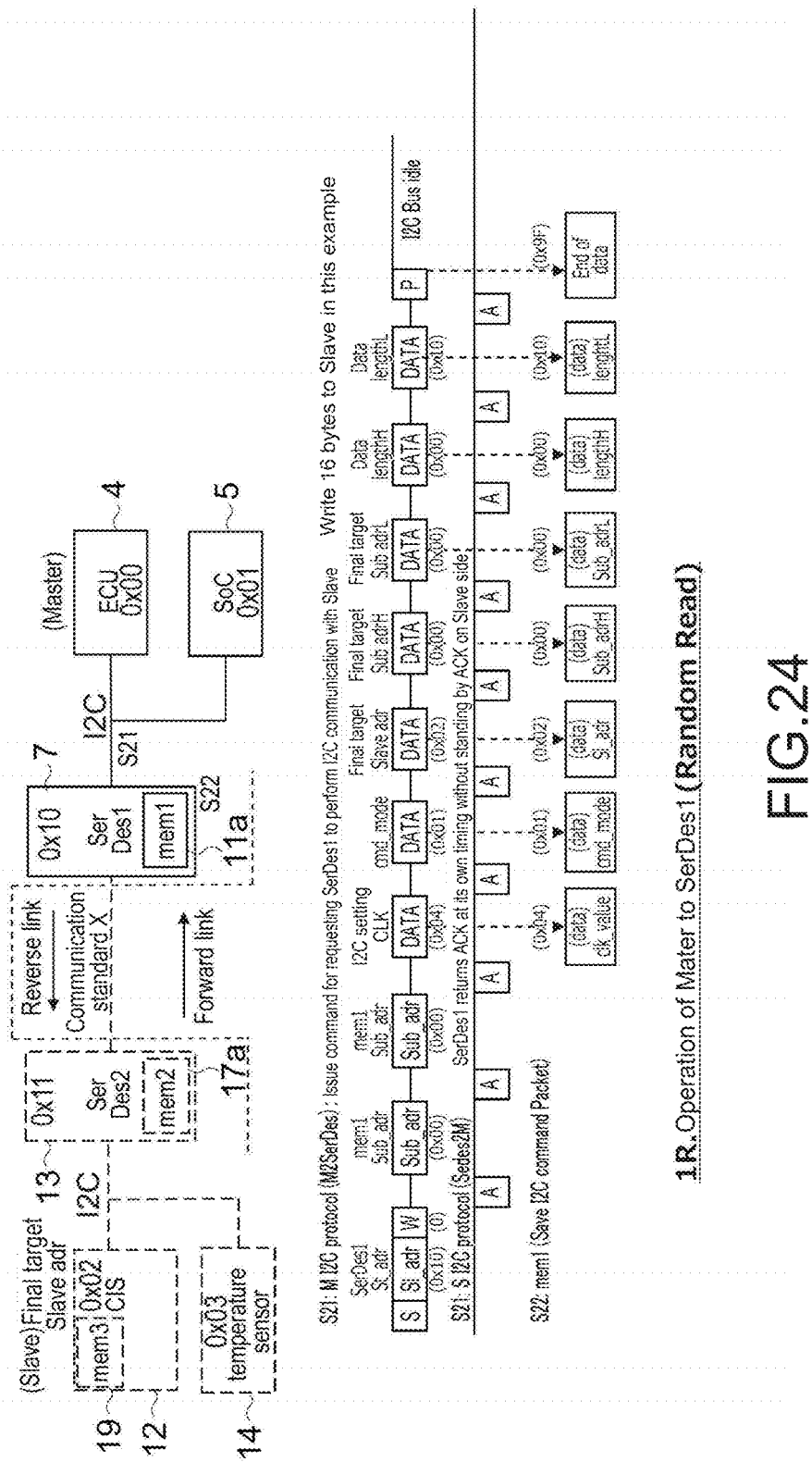
FIG. 24 is a diagram showing a Random Read operation.

Hereinafter, the processing procedure of the Random Read will be described in order on the basis of FIG. 24 to FIG. 34. FIG. 24 shows the procedure for transmitting an I2C command packet from the Master 21 to the Master SerDes 7. First, as shown in Step S21 of FIG. 24, the processing of the M I2C protocol (M2SerDes) is performed. Here, the Master 21 issues a command for requesting the Master SerDes 7 to perform I2C communication with the Slave 22. The command set transmitted from the Master 21 includes SerDes1 St_adr, mem1 Sub_adr, mem1 Sub_adr, I2C setting CLK, Cmd_mode, final target Slave_adr, final target Sub_adrH, final target Sub_adr, Data lengthH, Data lengthL, and P (STOP condition).

The Master SerDes 7 returns an ACK signal to the Master 21 in accordance with the S I2C protocol (SerDes2M) every time an information unit is received from the Master 21 (Step S21). Further, the Master SerDes 7 stores the received I2C command packet in the mem1 (Step S22). As shown in FIG. 25, the mem1 stores (data) CLK_value, (data) Cmd_mode, (data) Sl_adr, (data) Sub_adrH, (data) Sub_adrL, (data) length, (data) lengthL, and End of data.

FIG. 26 is a diagram that follows FIG. 24 and shows the processing of transmitting a Random Read command from the Master SerDes 7 to the Slave SerDes 13 in accordance with the communication protocol X. The Master SerDes 7 protocol-converts the data in the mem1 through the Packetized I2C on PHY (depend on the each PHY specification) forward channel and transmits the converted data to the Slave SerDes 13 (Step S23). More specifically, in the case where End of data is stored in the mem1 by Cmd_mode=0x00, the pieces of data in the mem1 are collectively I2C-command-converted and transmitted to the Slave SerDes 13 by the reserve link. Meanwhile, in the case where End of data is stored in the mem1 by Cmd_mode=0x10 and cmd_done is written, the pieces of data in the mem1 are collectively I2C-command-converted and transmitted to the Slave SerDes 13 by the reserve link. The Slave SerDes 13 protocol-converts the received data of the reserve link and stores the original stored data of the mem1 in the mem2 (Step S24). The Slave SerDes 13 determines, when End of data has been restored, that the restoration of the I2C command packet has been finished. FIG. 27 is a diagram showing an example of the stored data in the mem2.

FIG. 28A is a diagram that follows FIG. 26 and shows the processing of transmitting the random read command from the Slave SerDes 13 to the Slave 22. The Slave SerDes 13 transmits an I2C command packet to the Slave 22 in accordance with an M I2C protocol (SerDes2Slave) (Step S25). The Slave 22 returns an ACK signal to the Slave SerDes 13 for each received information unit in accordance with the S I2C protocol (Slave2SerDes), and sequentially transmits rdata to the Slave SerDes 13 in the order from the addresses specified by Sub_adrH and Sub_adrL. As shown in FIG. 29, the Slave SerDes 13 transmits an ACK signal indicating that rdata has been received to the Slave 22 for each byte, and stores the rdata from the Slave 22 in the mem2.

Figure 28B:
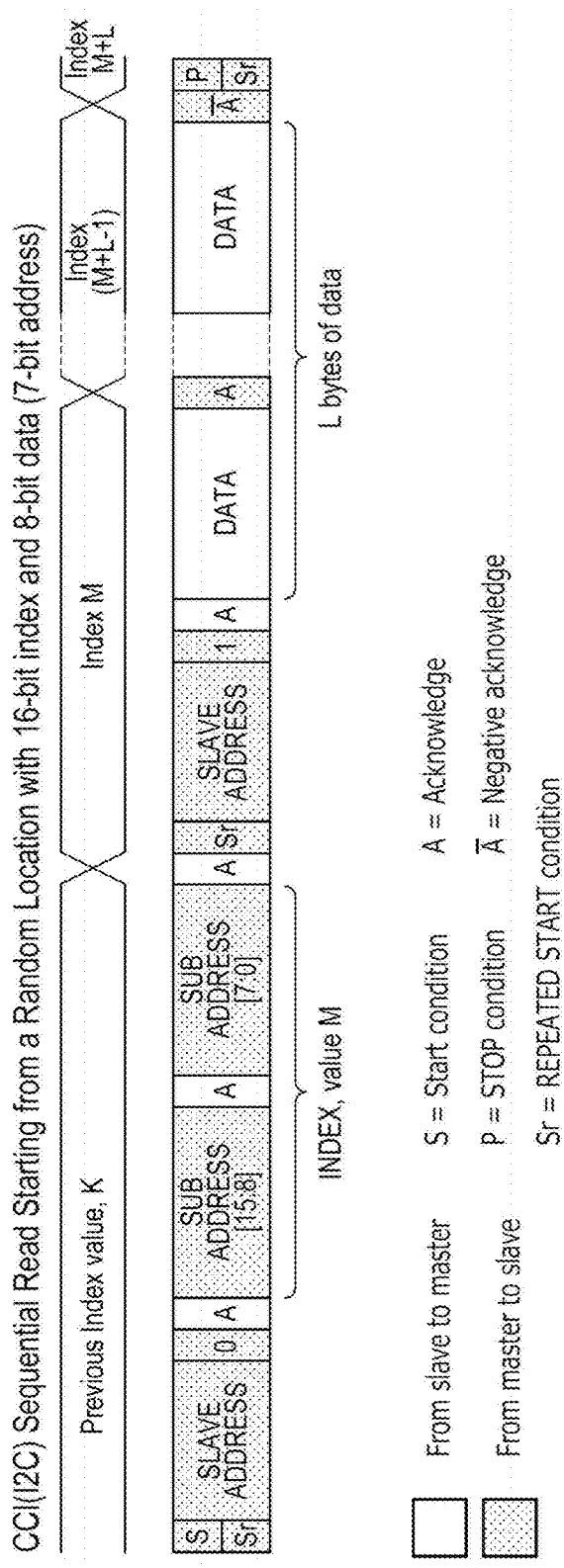
FIG. 28B is a diagram showing an I2C communication protocol during the Random Read operation.

It can be seen that the Slave SerDes 13 and the Slave 22 in FIG. 28A communicates with each other in accordance with a protocol conforming to the I2C communication protocol during the Random Read operation shown in FIG. 28B.

Figure 30:
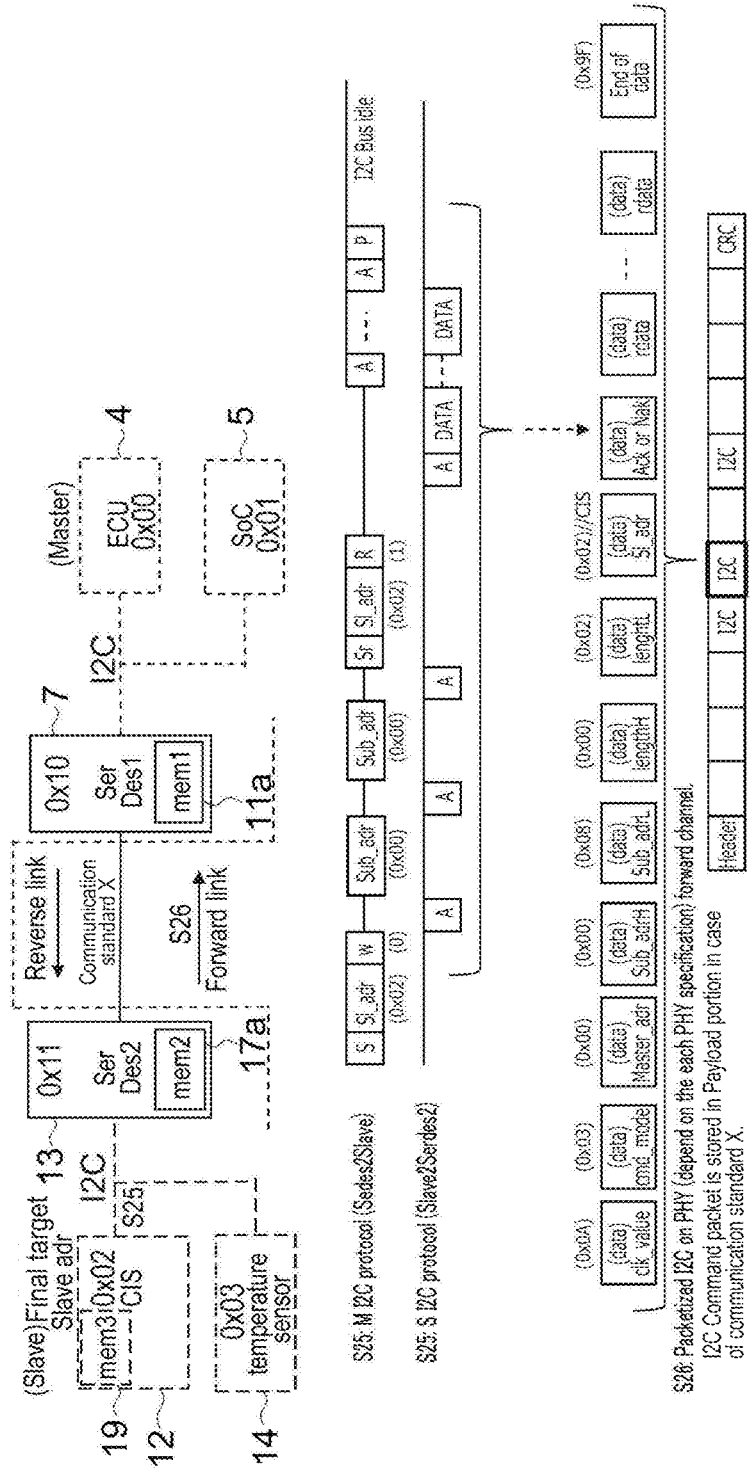
FIG. 30 is a diagram showing processing of transmitting a response to a Read command from the Slave SerDes to the Master SerDes in accordance with the communication standard X.

FIG. 30 is a diagram that follows FIG. 28 and shows the processing of returning a Read command from the Slave SerDes 13 to the Master SerDes 7 in accordance with the communication standard X. The Slave SerDes 13 transmits rdata via the packetized I2C on PHY (depend on the each PHY specification) forward channel (Step S26). More specifically, the Slave SerDes 13 converts the result (Rdata, ACK) of I2C communication with the Slave 22+End of data, and transmits the obtained data to the Master SerDes 7 by the forward link. FIG. 29 shows the stored data of the table3 in the mem2 after the Random Read operation.

Figure 31:
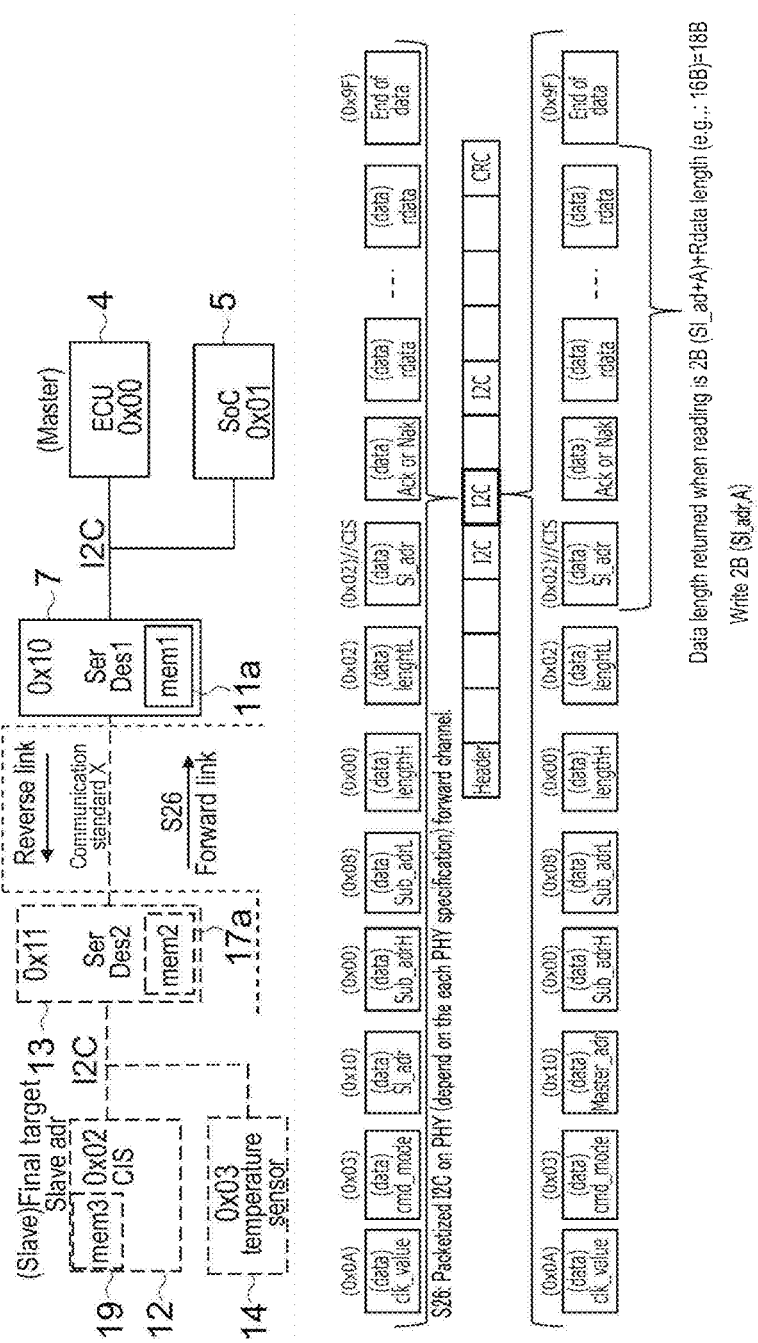
FIG. 31 is a diagram showing processing of the Master SerDes when the response from the Slave SerDes to the Random Read Command is received.

FIG. 31 is a diagram that follows FIG. 30 and shows the processing of the Master SerDes 7 when the response from the Slave SerDes 13 to the Random Read Command is received. The Master SerDes 7 protocol-converts the received data of the forward link and stores the received data including the result (ACK/NACK) of I2C communication with the Slave 22 in the mem1. FIG. 32 is a diagram showing an example of the data in the mem1 after receiving response data from the Slave SerDes 13 to the Random Read Command.

Figure 33:
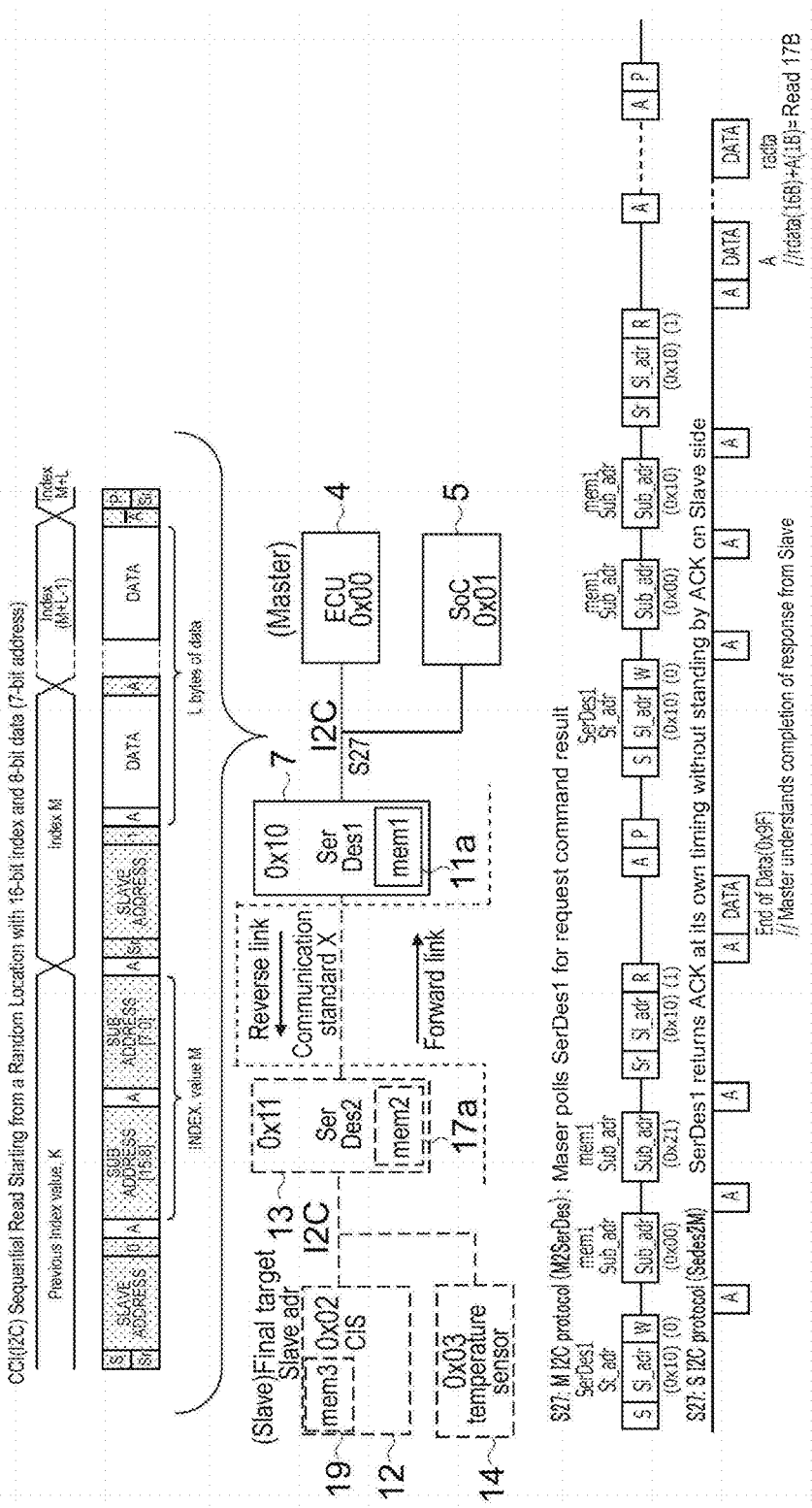
FIG. 33 is a diagram showing processing in the case where the Master polls the Master SerDes for the Random Read Command and reads the execution result.

FIG. 33 is a diagram showing the processing in the case where the Master 21 polls the Master SerDes 7 for the Random Read Command and reads the execution result. The Master 21 polls the Master SerDes 7 for the request command result in accordance with the M I2C protocol (M2SerDes) (Step S27). The Master 21 returns ACK to the Master 21 at its own timing without standing by ACK on the side of the Slave 22 (Step S27).

In the case where the result of "reading of 16 bytes to the Slave 22" for which the Master SerDes 7 is requested by the Master 21 has been finished, End of data (0x9F) and ACK (0x81) that is the result thereof can be read. If the result of reading End of data is other than 0x9F, the polling is continued. Although the result of End of Data is referred to by one byte read to determine polling and rdata (16 bytes)+ACK/NACK is read again by 17 byte Read in this example, the polling result and the result of I2C communication with the Slave 22 may be determined by reading 18 bytes at a time. If the result is NACK, the Master 21 is capable of checking, by reading Slave adr of Sub_Adr (15), whether or not the NACK is transmitted by the corresponding Slave 22.

FIG. 34 is a diagram showing an example of the stored data of the table1 in the mem1 before the storage area is released in response to the Random Read Command. Regarding reading of the 16 bytes from the Slave 22, since Header (7 bytes)+Sl_adr (1 byte+rdata (16 bytes)+A (1 byte)+End of data (1 byte)=26 bytes, next Sub_adr is N=34 because Sub_adr=8~33 is used.

FIG. 19 is a diagram showing transmission of a signal for releasing the storage area of the mem1 from the Master 21 to the Master SerDes 7 as processing of finishing Random Read operation. The Master 21 completes reading of the request command result in accordance with the M I2C protocol (M2SerDes), and issues a clear processing command of the Master SerDes 7 (Step S28). The Master SerDes 7 may release, in the case where 0xFF is written to mem1 Sub_adr (N), the area of the mem1, which has been used, as processing of finishing the request command. Alternatively, the Master 21 may issue a write command for initializing the memory area used by the Master 21.

Figure 35A:
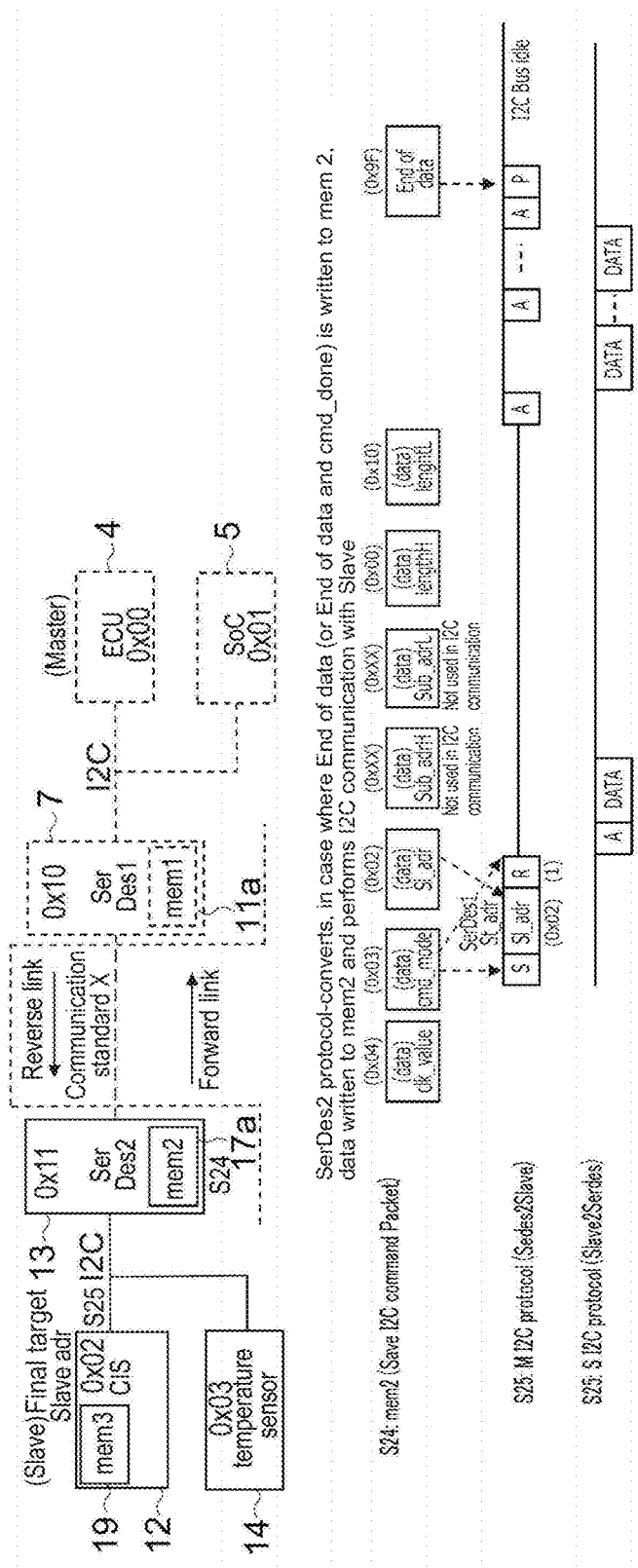
FIG. 35A is a diagram showing processing in the case where Current read is performed.
Figure 35B:
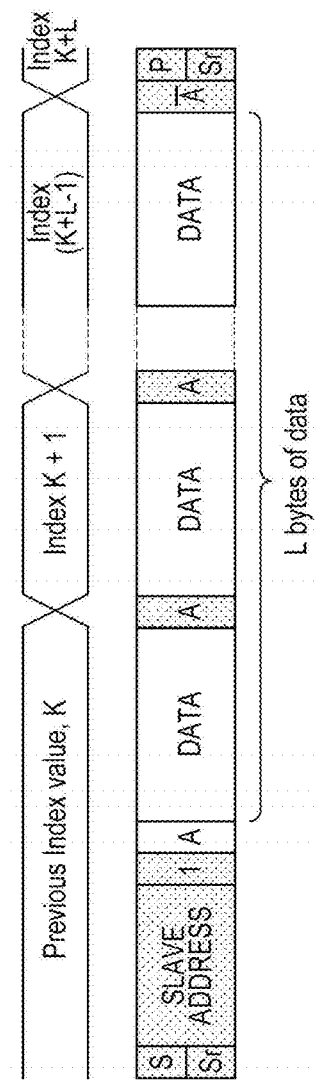
FIG. 35B is a diagram showing an I2C communication protocol in the case where Current read is performed.

FIG. 34 is a diagram showing an example of the stored data of the table1 in the mem1. Clear is written to Sub_adr (N). FIG. 35A is a diagram showing the processing in the case where Current read is performed. FIG. 35B is a diagram showing the I2C protocol in the case where Current read is performed. FIG. 36 is a diagram showing an example of the stored data of the table3 in the mem2 in the case where Current read is performed.

Although the processing in which the Slave SerDes 13 performs random read on the Slave 22 has been described in FIG. 28A, it is necessary to always perform random read when accessing the mem3 in the Slave 22 first as shown in FIG. 35A but current read may be performed at the second time and subsequent times.

When End of data or End of data and cmd_done are written to the mem2, the Slave SerDes 13 I2C-protocol-converts the data written to the mem2 and performs I2C communication with the Slave 22. In the case of performing current read (in the case where Cmd_mode[3:0]=1001), Sub_adrH and Sub_adrL in the mem2 shown in FIG. 36 are not used. For this reason, the I2C command protocol transmitted from the Slave SerDes 13 to the Slave 22 is reduced by two bytes.

It can be seen that the Slave SerDes 13 and the Slave 22 shown in FIG. 35A perform communication in accordance with a protocol conforming to the I2C communication protocol shown in FIG. 35B.

As described above, in this embodiment, in the case where data communication is performed between the Master 21 and the Slave 22, and the Master SerDes 7 and the Slave SerDes 13 are provided between the Master 21 and the Slave 22, the Master SerDes 7 returns, when the Master SerDes 7 receives the command transmitted to the Slave 22 by the Master 21, ACK to the Master 21 by its own determination without standing by ACK from the Slave 22. As a result, the Master 21 can quickly receive ACK and quickly perform processing after receiving ACK. That is, the Master 21 is capable of shortening the period in which the clock is stretched until ACK is received, and it is possible to improve the processing efficiency of the Master 21.

Figure 37:
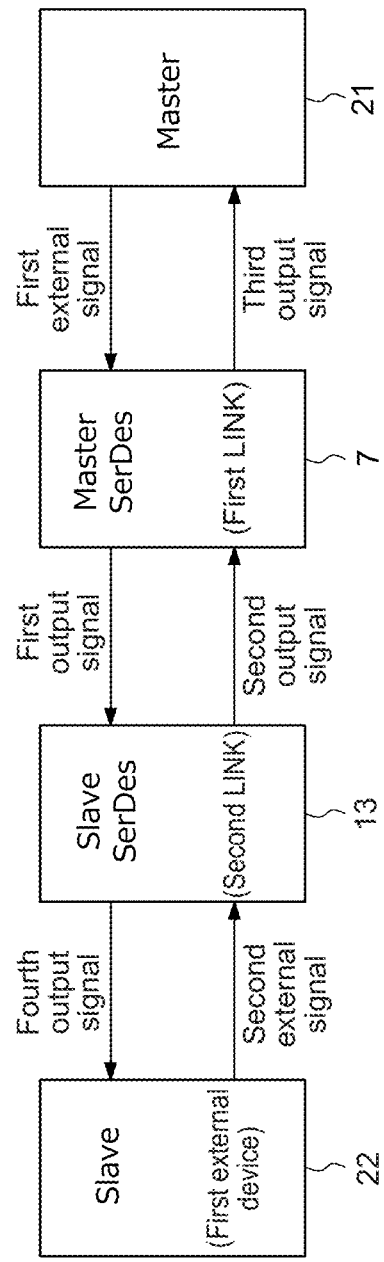
FIG. 37 is an equivalent block diagram of a communication system according to this embodiment.

FIG. 37 is an equivalent block diagram of the communication system 3 according to this embodiment. In the communication system 3 in FIG. 37, in the case where data communication is performed between a first external device corresponding to the Master 21 and a second external device corresponding to the Slave 22, the Master SerDes 7 and the Slave SerDes 13 are provided between the Master 21 and the Slave 22 to relay the data communication between the Master 21 and the Slave 22. The Master SerDes 7 includes a first LINK (LINK 11). The Slave SerDes 13 includes a second LINK (LINK 17). The first LINK generates a first output signal on the basis of a first external signal from the Master 21, outputs the generated first output signal to the Slave SerDes 13, generates a third output signal on the basis of a second output signal from the Slave SerDes 13, and outputs the generated third output signal to the Master 21. The second LINK generates a second output signal on the basis of a second external signal from the Slave 22, outputs the generated second output signal to the Master SerDes 7, generates a fourth output signal on the basis of a first output signal from the Master SerDes 7, and outputs the generated fourth output signal to the Slave.

Each of the first output signal, the second output signal, the first external signal, and the second external signal includes Cmd_mode indicating the content of the command transmitted from the Master 21, Slave_Adr for identifying the Slave 22, internal address information Sub_Adr of the Slave 22, a data length Length of the data transmitted from the Master 21, an end position End of Data of the data transmitted from the Master 21.

By configuring the communication system 3 as shown in FIG. 37, it is possible to perform data communication between the Master 21 and the Slave 22 at high speed.

It is possible to perform data communication at high speed between the Master SerDes 7 and the Slave SerDes 13 by, for example, a TDD method or an FDD (Frequency Division Duplexing) method.

It should be noted that the present technology may take the following configurations.

(1) A communication device, including:
a LINK that generates a first output signal on a basis of a first external signal from a first external device, outputs the first output signal to a second external device, generates a second output signal on a basis of a second external signal from the second external device, and outputs the second output signal to the first external device, in which
each of the first output signal and the second external signal includes
command information indicating content of a command transmitted from the first external device,
final-destination-device-identification-information for identifying a final destination device of data transmitted from the first external device,
internal address information indicating an internal address of the final destination device,
data length information indicating a length of the data transmitted from the first external device, and
data-end-position-information indicating an end position of the data transmitted from the first external device.

(2) The communication device according to (1), in which
the final-destination-device-identification-information is located next to the command information,
the internal address information is located next to the final-destination-device-identification-information, and
the data length information is located next to the internal address information.

(3) The communication device according to (1) or (2), in which
the command information includes command format information for defining a command format according to a predetermined communication standard between the communication device and the second external device.

(4) The communication device according to any one of (1) to (3), in which
the command information includes data-end-determination-condition-information for specifying a condition for determining end of the data transmitted from the first external device.

(5) The communication device according to according to any one of (1) to (4), in which
each of the first output signal and the second external signal further includes communication frequency information for specifying a communication frequency between the second external device and the final destination device.

(6) The communication device according to any one of (1) to (5), in which
each of the first output signal and the second external signal includes a command obtained by protocol-converting a command of I2C (Inter-Integrated Circuit) communication into a command of a predetermined communication standard between the communication device and the second external device.

(7) The communication device according to any one of (1) to (6), in which
the LINK transmits, to the first external device, an ACK signal indicating an acknowledge or a NACK signal indicating a negative acknowledge every time the LINK receives each information unit constituting the first external signal from the first external device.

(8) The communication device according to any one of (1) to (7), in which
the LINK includes a storage unit that stores a signal corresponding to the first external signal and a signal corresponding to the second external signal, and
the LINK collectively performs, where reception of the first external signal from the first external device is finished, protocol-conversion on the first external signals that have been received and stored in the storage unit and then generates the first output signal.

(9) The communication device according to (8), in which
the protocol-conversion performed by the LINK is protocol-conversion compatible with TDD (Time Division Duplex).

(10) The communication device according to (8) or (9), in which
the LINK transmits the first output signal to the second external device, and stores, upon receiving information indicating that processing on the first output signal has been completed from the second external device, a signal indicating completion of the processing in the storage unit.

(11) The communication device according to any one of (8) to (10), in which
the LINK releases a storage area of the storage unit on a basis of a command from the first external device.

(12) The communication device according to any one of (1) to (11), in which
the LINK outputs, to the first external device, processing completion information for the second external signal transmitted from the second external device in response to a request signal from the first external device or performs interrupting processing on the first external device to output it to the first external device.

(13) The communication device according to any one of (1) to (12), in which
the LINK receives, from the first external device, the first external signal including output instruction information for instructing output of the first output signal and transmission finishing information indicating that transmission of the first external signal is finished.

(14) The communication device according to any one of (1) to (13), in which
the LINK recognizes, where a first value has been received as data-end-determination-condition-information for specifying a condition for determining end of the data transmitted from the first external device and then transmission finishing information indicating that transmission of the first external signal is finished has been received, that the first external signal to be transmitted from the first external device has ended.

(15) The communication device according to any one of (1) to (14), in which
the LINK recognizes, where a second value has been received as data-end-determination-condition-information for specifying a condition for determining end of the data transmitted from the first external device and then output instruction information for instructing output of the first output signal and transmission finishing information indicating that transmission of the first external signal is finished have been received, that the first external signal transmitted from the first external device has ended regardless of a value of the data-end-determination-condition-information received after the reception of the second value.

(16) The communication device according to (8) or (9), in which
the LINK transmits the first output signal to the second external device and then releases a storage area of the storage unit.

(17) The communication device according to (8), (9) or (16), in which
the LINK performs, a predetermined number of times or within a predetermined time, at least one of
outputting of a signal obtained by performing protocol conversion on the second output signal in response to a signal based on the second external signal stored in the storage unit to the first external device for each information unit and
receiving of each information unit constituting the first external signal output from the first external device.

(18) A communication system, including:
a Master SerDes including a first LINK; and
a Slave SerDes including a second LINK, wherein
the first LINK generates a first output signal on a basis of a first external signal from a Master, outputs the first output signal to the Slave SerDes, generates a third output signal on a basis of a second output signal from the Slave SerDes, and outputs the third output signal to the Master,
the second LINK generates the second output signal on a basis of a second external signal from a Slave, outputs the second output signal to the Master SerDes, generates a fourth output signal on a basis of the first output signal from the Master SerDes, and outputs the fourth output signal to the Slave, and
each of the first output signal, the second output signal, the first external signal, and the second external signal includes
command information indicating content of a command transmitted from the Master,
final-destination-device-identification-information for identifying the Slave,
internal address information indicating an internal address of the Slave,
data length information indicating a length of data transmitted from the Master, and
data-end-position-information indicating an end position of the data transmitted from the Master.

The aspects of the present disclosure are not limited to the individual embodiments described above, and include various modifications that are conceivable by those skilled in the art, and also the effects of the present disclosure are not limited to the content described above. That is, various additions, modifications, and partial deletions are possible without departing from the conceptual idea and essence of the present disclosure derived from the content specified in the claims and equivalents thereof.

REFERENCE SIGNS LIST 1 communication device, 3 communication system, 4 ECU, 4 I2C, 5SoC, 5a I2C, 7 Master SerDes, 8 I2C Cmd Unit, 9 Fw. Rx, 10 Rv. Tx, 11 LINK, 11a mem, 12 image sensor, 12a I2C, 13 Slave SerDes, 14 temperature sensor, 17 LINK, 19 mem, 20 mem, 21 Master, 22 Slave

The invention claimed is:
1. A communication device, comprising:
a LINK that generates a first output signal on a basis of a first external signal from a first external device, outputs the first output signal to a second external device, generates a second output signal on a basis of a second external signal from the second external device, and outputs the second output signal to the first external device, wherein
each of the first output signal and the second external signal includes
command information indicating content of a command transmitted from the first external device,
final-destination-device-identification-information for identifying a final destination device of data transmitted from the first external device,
internal address information indicating an internal address of a circuitry included in the final destination device,
data length information indicating a length of the data transmitted from the first external device,
data-end-position-information indicating an end position of the data transmitted from the first external device; and a command obtained by protocol-converting a command of I2C (Inter-Integrated Circuit) communication into a command of a predetermined communication standard between the communication device and the second external device.

2. The communication device according to claim 1, wherein
the final-destination-device-identification-information is located next to the command information, the internal address information is located next to the final-destination-device-identification-information, and
the data length information is located next to the internal address information.

3. The communication device according to claim 1, wherein
the command information includes command format information for defining a command format according to a predetermined communication standard between the communication device and the second external device.

4. The communication device according to claim 1, wherein
the command information includes data-end-determination-condition-information for specifying a condition for determining end of the data transmitted from the first external device.

5. The communication device according to claim 1, wherein
each of the first output signal and the second external signal further includes communication frequency information for specifying a communication frequency between the second external device and the final destination device.

6. The communication device according to claim 1, wherein
the LINK transmits, to the first external device, an ACK signal indicating an acknowledge or a NACK signal indicating a negative acknowledge every time the LINK receives each information unit constituting the first external signal from the first external device.

7. The communication device according to claim 1, wherein
the LINK includes a storage unit that stores a signal corresponding to the first external signal and a signal corresponding to the second external signal, and
the LINK collectively performs, where reception of the first external signal from the first external device is finished, protocol-conversion on the first external signals that have been received and stored in the storage unit and then generates the first output signal.

8. The communication device according to claim 7, wherein
the protocol-conversion performed by the LINK is protocol-conversion compatible with TDD (Time Division Duplex).

9. The communication device according to claim 7, wherein
the LINK transmits the first output signal to the second external device, and stores, upon receiving information indicating that processing on the first output signal has been completed from the second external device, a signal indicating completion of the processing in the storage unit.

10. The communication device according to claim 7, wherein
the LINK releases a storage area of the storage unit on a basis of a command from the first external device.

11. The communication device according to claim 7, wherein
the LINK transmits the first output signal to the second external device and then releases a storage area of the storage unit.

12. The communication device according to claim 7, wherein
the LINK performs, a predetermined number of times or within a predetermined time, at least one of
outputting of a signal obtained by performing protocol conversion on the second output signal in response to a signal based on the second external signal stored in the storage unit to the first external device for each information unit and
receiving of each information unit constituting the first external signal output from the first external device.

13. The communication device according to claim 1, wherein
the LINK outputs, to the first external device, processing completion information for the second external signal transmitted from the second external device in response to a request signal from the first external device or outputs, to the first external device, an interrupt request flag for performing interrupting processing on the first external device.

14. The communication device according to claim 1, wherein
the LINK receives, from the first external device, the first external signal including output instruction information for instructing output of the first output signal and transmission finishing information indicating that transmission of the first external signal is finished.

15. The communication device according to claim 1, wherein
the LINK recognizes, where a first value has been received as data-end-determination-condition-information for specifying a condition for determining end of the data transmitted from the first external device and then transmission finishing information indicating that transmission of the first external signal is finished has been received, that the first external signal to be transmitted from the first external device has ended.

16. The communication device according to claim 1, wherein
the LINK recognizes, where a second value has been received as data-end-determination-condition-information for specifying a condition for determining end of the data transmitted from the first external device and then output instruction information for instructing output of the first output signal and transmission finishing information indicating that transmission of the first external signal is finished have been received, that the first external signal transmitted from the first external device has ended regardless of a value of the data-end-determination-condition-information received after the reception of the second value.

17. The communication device according to claim 1, wherein the circuitry is a memory included in the final destination device.

18. A communication system, comprising:
a Master SerDes including a first LINK; and
a Slave SerDes including a second LINK, wherein
the first LINK generates a first output signal on a basis of a first external signal from a Master, outputs the first output signal to the Slave SerDes, generates a third output signal on a basis of a second output signal from the Slave SerDes, and outputs the third output signal to the Master, the second LINK generates the second output signal on a basis of a second external signal from a Slave, outputs the second output signal to the Master SerDes, generates a fourth output signal on a basis of the first output signal from the Master SerDes, and outputs the fourth output signal to the Slave, each of the first output signal, the second output signal, the first external signal, and the second external signal includes command information indicating content of a command transmitted from the Master, final-destination-device-identification-information for identifying the Slave, internal address information indicating an internal address of a circuitry included in the Slave, data length information indicating a length of data transmitted from the Master, and data-end-position-information indicating an end position of the data transmitted from the Master; and each of the first output signal and the second externa signal includes a command obtained by protocol-converting a command of I2C (Inter-Integrated Circuit) communication into a command of a predetermined communication standard between the Master and the Slave.

19. The communication system according to claim 18, wherein the circuitry is a memory included in the Slave.

* * * * *